(12) United States Patent
Ortega et al.

(10) Patent No.: US 6,757,343 B1
(45) Date of Patent: Jun. 29, 2004

(54) DISCRETE WAVELET TRANSFORM SYSTEM ARCHITECTURE DESIGN USING FILTERBANK FACTORIZATION

(75) Inventors: Antonio Ortega, Los Angeles, CA (US); Wenqing Jiang, Milipitas, CA (US)

(73) Assignee: University of Southern California, Los Angeles, CA (US)

( * ) Notice: Subject to any disclaimer, the term of this patent is extended or adjusted under 35 U.S.C. 154(b) by 529 days.

(21) Appl. No.: 09/596,242

(22) Filed: Jun. 16, 2000

Related U.S. Application Data

(60) Provisional application No. 60/140,026, filed on Jun. 16, 1999.

(51) Int. Cl.[7] .............................. H03D 1/00; H04L 27/06
(52) U.S. Cl. .................. 375/340; 375/329; 375/240.19; 708/300
(58) Field of Search ................................. 375/229, 232, 375/350, 329, 340, 240.18, 240.19; 708/400, 313, 323, 300

(56) References Cited

U.S. PATENT DOCUMENTS

| | | | |
|---|---|---|---|
| 5,568,142 A | * 10/1996 | Velazquez et al. | 341/126 |
| 5,995,539 A | * 11/1999 | Miller | 375/222 |
| 6,038,579 A | * 3/2000 | Sekine | 708/400 |
| 6,278,753 B1 | * 8/2001 | Suarez et al. | 375/350 |
| 6,523,051 B1 | * 2/2003 | Majani et al. | 708/300 |

OTHER PUBLICATIONS

Daubechies and Sweldens, "Factoring Wavelet Transforms into Lifting Steps" by Daubechies and Swelding, Journal Fourier Analysis, vol. 3, 1998, pp. 245–267.*

Jiang et al., "Parallel Architecture for the Discrete Wavelet Transform based on the Lifting Factorization," Proc. of SPIE Conf. on Parallel and Distributed Methods for Image Processing III, Denver, Colorado, SPIE vol. 3817, pp. 2–13, Jul. 1999.

Jiang et al., "Efficient Discrete Wavelet Transform Architectures based on Filterbank Factorizations," IEEE, pp. 749–753, presented at the International Conf. On Image Processing, Kobe, Japan, Oct. 1999.

* cited by examiner

Primary Examiner—Tesfaldet Bocure
Assistant Examiner—Qutbuddin Ghulamali
(74) Attorney, Agent, or Firm—Fish & Richardson P.C.

(57) ABSTRACT

Techniques to overlap states for efficient multilevel wavelet decompositions to reduce memory and delay in discrete wavelet transform in a block-by-block fashion. The input data is segmented into blocks and each block is processed separately, either sequentially or in parallel. Results of partially completed computations in each block is saved and used to complete computations in an adjacent block.

32 Claims, 27 Drawing Sheets

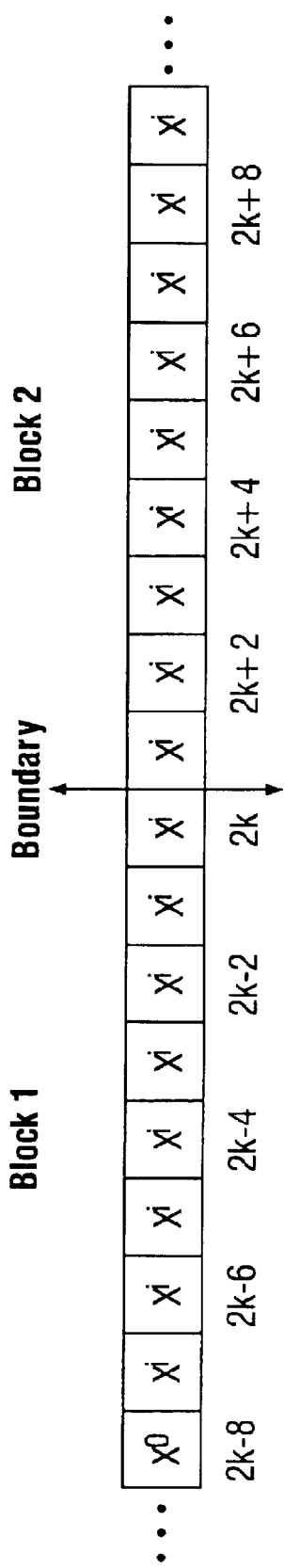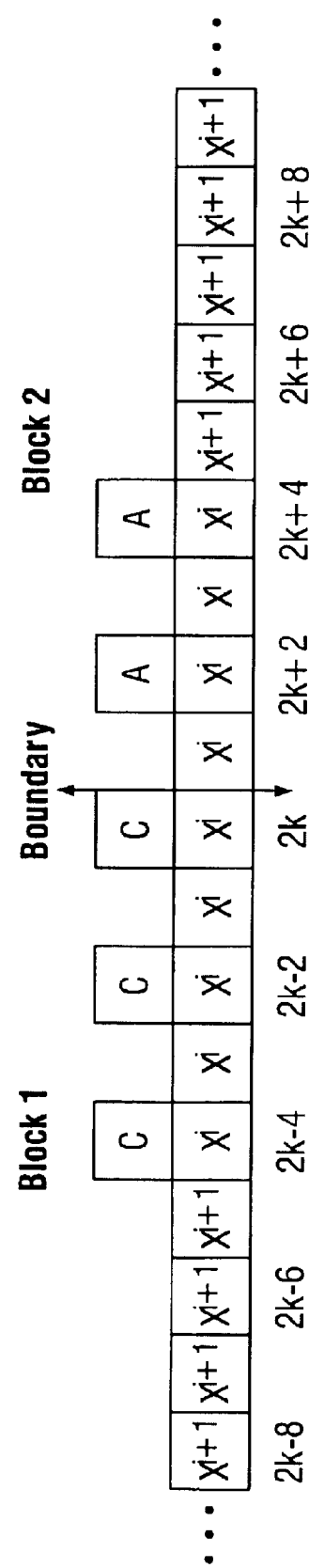

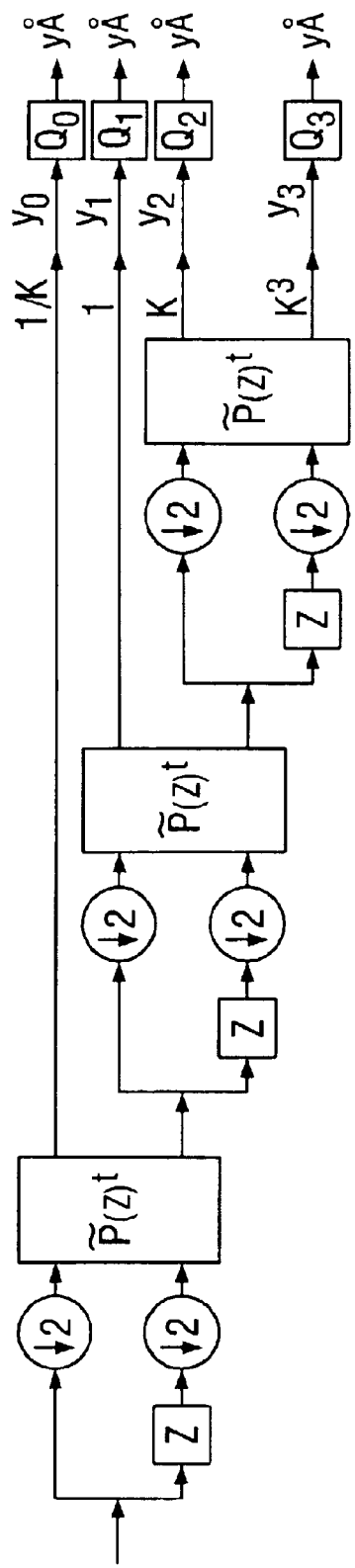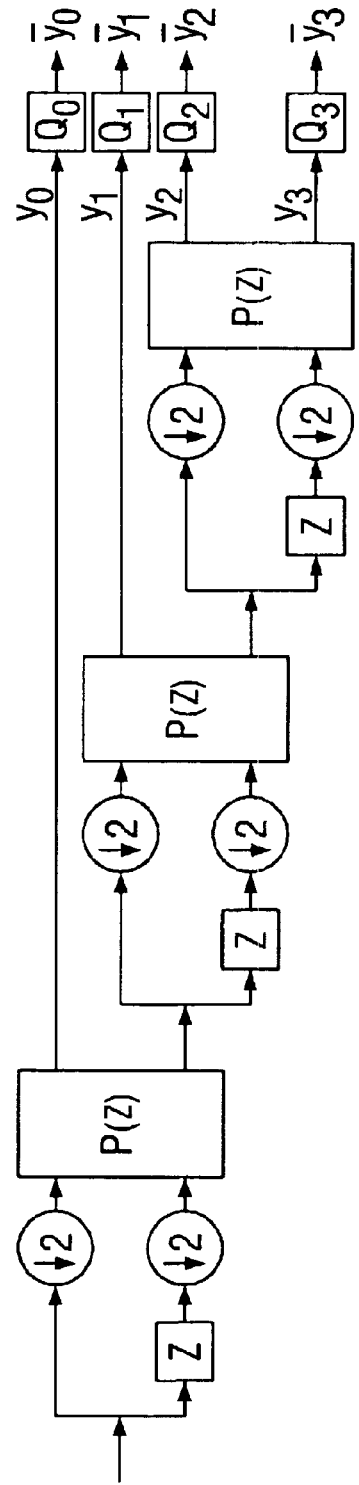
FIG. 20A
FIG. 20B

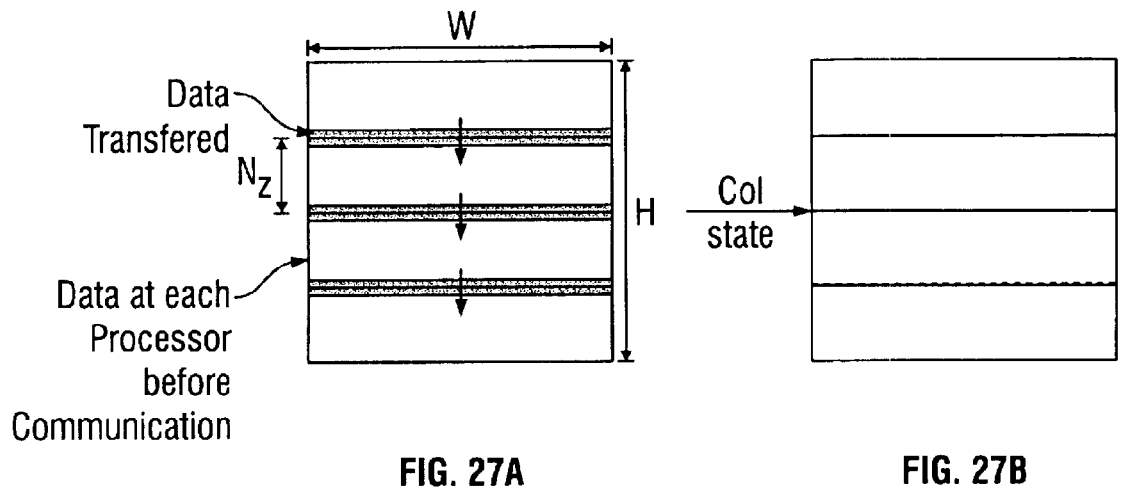
FIG. 27A  FIG. 27B
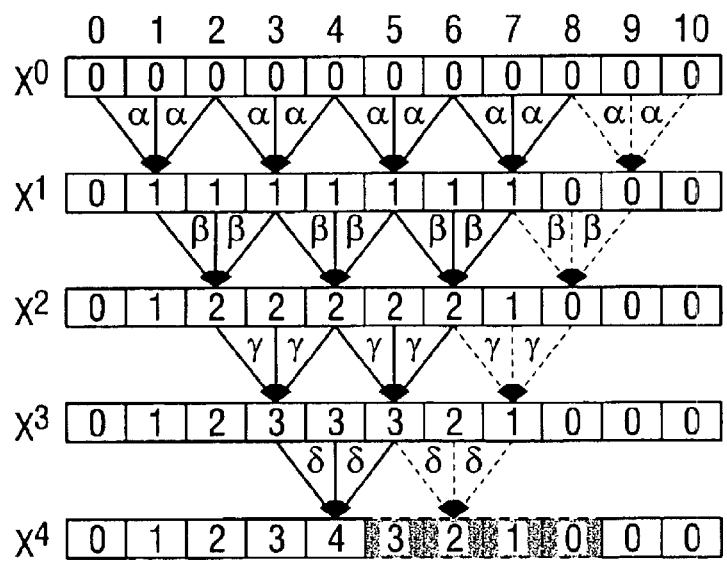
FIG. 28

DISCRETE WAVELET TRANSFORM SYSTEM ARCHITECTURE DESIGN USING FILTERBANK FACTORIZATION

This application claims the benefit of the U.S. provisional application No. 60/140,026, filed on Jun. 16, 1999.

BACKGROUND

This application relates to digital signal processing based on the wavelet transform, and more specifically, to techniques for performing a discrete wavelet transform using filterbank factorizations.

Wavelet transforms are developed as an alternative to various Fourier transforms to analyze and extract components of a signal, especially when the spectral composition of the signal changes with time as is the case for certain imaging signals. For example, a time-varying signal can be analyzed by a wavelet transform to decompose the signal into various spectral components and their dependence with time. A wavelet transform uses a wavelet as a window filter with a varying scale and a varying wavelet translation in time to correlate with the time-varying signal. This correlation can obtain the spectral information at multiple different spectral resolutions and the position information of different spectral components in time.

The discrete wavelet transform ("DWT") uses a bank of digital filters with different cutoff frequencies to analyze sequential samples of a time-varying signal at different scales. The filters may include a set of high-pass filters to analyze high-frequency components and a set of low-pass filters to analyze low-frequency components. This allows the multi-resolution analysis. Upsampling and downsampling can be used to change the scale in the discrete wavelet transform. Interpolation filters and decimation filters may be used for these purposes. The discrete wavelet transform is a powerful tool for multiscale time-frequency signal decomposition and analysis. This technique can be used in many applications, such as signal processing, digital communications, numerical analysis, and computer graphics.

The system design for implementing the discrete wavelet transform may be limited by a number of practical considerations, such as the available buffer size, processing delay, processing power, chip area, and the impact of the control complexity. In general, two different types of system architectures, namely, sequential and parallel architectures, may be used for the discrete wavelet transform.

The sequential architecture may be implemented to compute the DWT by splitting an input signal into sequential blocks in time. A processor such as a microprocessor or other computer processors may be used to operate on one block at a time to process the different blocks at different times [7], [12], [22]. The sequential architecture may be used when there is only a limited amount of memory available for the transform computation. Exemplary scenarios include image compression/decompression systems using a DSP/ASIC chip in consumer electronics products (e.g., digital cameras) or space-borne instruments [12], [22], [23]. It is desirable in these applications to limit the memory buffer size of the system. This can not only keep the cost low but also reduce the chip design area to achieve a compact volume of the final product.

Alternatively, one implementation of a parallel architecture splits the input into blocks among several processors so that the processors operate on different blocks at the same time. [11], [24], [10], [21], [16]. This can speed up the transform computation for applications where a large volume of data has to be processed in a reasonably short time. For instance, seismic data processing [21] or illumination computations in computer graphics [17] are potential applications. Fast DWT computation to meet stringent delay constraints can be critical to the success of any wavelet-based techniques.

SUMMARY

The present DWT techniques include a method for performing DWT computation on an input signal. The input signal is partitioned into consecutive blocks of samples. A multilevel filtering operation is then performed on a first block by using a discrete wavelet transform algorithm, without using information from a second adjacent block.

Computations of the multilevel filtering operation that are computable based on information solely from the first block are completed and then partially completed results from some samples in the first block are saved. The multilevel filtering operation cannot be completed on these samples in the first block without specified input from the second adjacent block.

After the above operations within the first block, the specified input from the second adjacent block is then used to complete the multilevel filtering operation on the samples with the partially completed results in the first block.

DESCRIPTION OF DRAWINGS

FIGS. 6A through 6C show one example of implementing the overlap-state technique in the parallel DWT processing by using two or more processors to operate simultaneously.

FIG. 20A shows a system for separate implementation of the transform and quantization operations to reduce computation.

FIG. 20B shows a system with joint transform and quantization.

FIG. 27 shows merge operations for strip parallel implementation. (a) transfer of row state information from $P_i$ to $P_{i+1}$; and (b)complete transforms for boundary samples in each processor.

FIG. 28 illustrates state transitions of the Daubechies (9,7) filters using factorization, where the state information includes 4 samples (the overlap buffer size) in shaded boxes. Dashed lines represent operations necessary for the transform of the new input sample pair $\{x^0(9),x^0(10)\}$.

DETAILED DESCRIPTION

The discrete wavelet transform may be implemented by a series of filtering stages each having a high-pass filter and a low-pass filter connected in parallel. Hence, an input to a filtering stage is filtered by the low-pass filter to produce one output with the low frequency components of the input. At the same time, this input is also filtered by the high-pass filter to produce another output with high frequency components. This filtering operation repeats at each stage to decompose the input signal.

Figure 1:
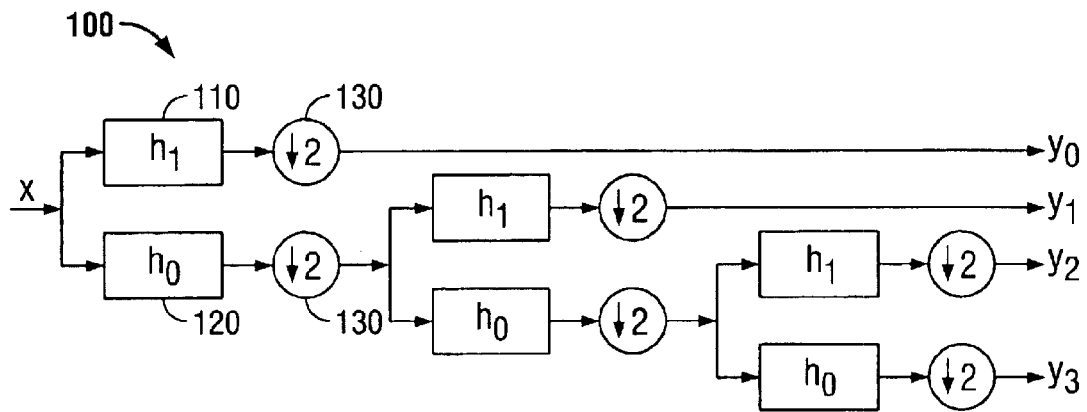
FIG. 1 shows an exemplary circuit architecture for a 3-stage discrete wavelet transform (DWT) decomposition.

FIG. 1 shows an exemplary circuit architecture for a 3-stage DWT composition. Each stage includes a high-pass filter (g) 110 and a low-pass filter (h) 120. The output terminal of each filter 110 or 120 of a filtering stage is connected to a downsampling circuit 130 to remove one half of the samples. The four outputs $y_0(n)$, $y_1(n)$, $y_2(n)$, and $y_3(n)$ represent the DWT output of the input x(n).

The above process of filtering and downsampling operations need be performed recursively on the input data at each stage for multilevel decompositions. Since filtering operations in DWT generally can not be implemented as a block transform (with the exception of the trivial Haar transform), this recursive nature of the DWT computation poses special challenges when stringent memory and delay constraints have to be observed for practical DWT system designs.

One constraint in performing a DWT is that each block of samples cannot be processed independent of samples from another block such as an adjacent block when finite impulse response ("FIR") filters are implemented. A FIR filter with a finite length L, when operating on samples in one block near the boundary with another adjacent block, may need the data from the adjacent block to complete the filtering computation on the samples within the block. Hence, two adjacent blocks need to communicate to transfer the needed data.

Figure 2:
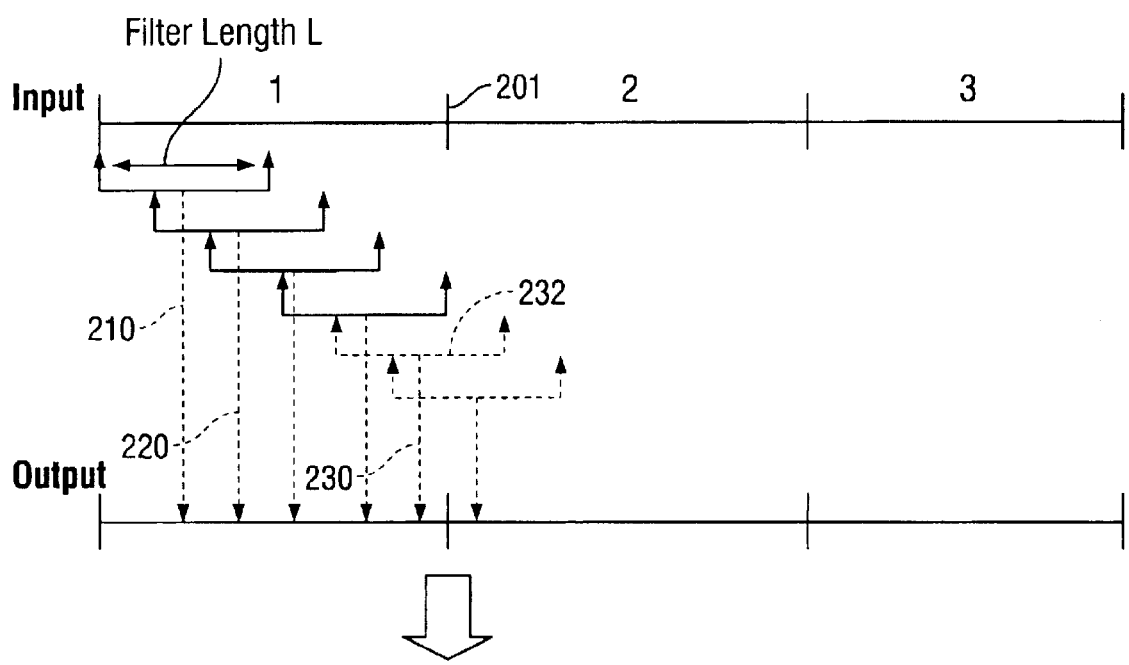
FIG. 2 illustrates the need of data in processing one block from another block when the input is segmented into consecutive blocks.

FIG. 2 illustrates such a need of data in processing one block from another block. Three consecutive data blocks 1, 2, and 3 are shown. It is assumed that the FIR filter has a length of L. In performing DWT computation on the samples in the block 1, the FIR filter first operates on first segment of L samples in the block 1 to produce one DWT output 210 and then shifts to operate on the next segment with L samples, which overlaps the last (L−1) samples in the first segment, to produce another DWT output 220. When the FIR filter shifts to operate on the samples in the block 1 near the boundary 201 between the blocks 1 and 2, a portion of the required FIR filter inputs falls within the block 2. For example, when the FIR filter is at a position 232, the filter needs data from both blocks 1 and 2 to produce the DWT output 230.

However, the data from the block 2 may not be available to the FIR filter when the filter is at the position 232. For example, in the sequential architecture, blocks become available sequentially in time. It is possible that the needed data from block 2 has not arrived when the filter is computing the output 230 at the position 232. A delay occurs since the processor needs to wait until the data from the block 2 becomes available. The DWT computation by block partition may be performed by either splitting the data in blocks that have an overlap or, equivalently, keeping samples from block 1, that will be used by the DWT computation for the block 2. In either case, a certain amount of memory is needed to store information from the block 1 that is needed in block 2.

Many sequential architecture designs adopt the standard FFT-based filtering techniques [34], i.e., overlap-add or overlap-save. These include the recursive pyramid algorithm (RPA) by Vishwanath [7], the spatially segmented wavelet transform (SSWT) by Kossentini [28], and the reduced line-based compression system by Chrysafis et al. [12], [35]. Since the SSWT overlaps data only once before the start of the transform, the overlap buffer size increases exponentially with the increase of decomposition levels. An alternative is implemented in [7], [12] where data is overlapped at each level of decomposition and the buffer size is reduced.

The need of data from another data block may also rise in the parallel DWT architecture. Assume, for example, that the three-level wavelet decomposition shown in FIG. 1 is performed using two separate processors 1 and 2, with each processor being allocated half of the input data. A problem arises when DWT is computed near data boundaries at both processors, e.g., the boundary 201 between blocks 1 and 2 in FIG. 2. Because DWT is not a block transform, for correct wavelet coefficients computation near data boundaries, each processor would need to access data allocated to the other processor. In this case, either the two processors exchange data before each level of the decomposition or the two processors are given sufficient overlapped data to carry on the whole computation without communication with each other.

The first approach may require frequent data exchanges between processors. This, however, can increase the communication overhead and thus adversely affect the system scalability in a parallel architecture, particularly in the presence of slow communication links, for example, when using a network of workstation (NOWs) or a local area multicomputer (LAM)[25], [1], [26], [27]. The second approach, although avoiding frequent communications between the processors, needs to overlap data at each processor. This overlap, due to the recursive nature of the DWT filtering operations, can be large as the levels of filtering stages increases. Hence, the required memory space can also be large in the multi-level decomposition system and can be very expensive in terms of memory and communication [28].

Some parallel architecture designs are developed to increase the efficiency of the DWT operation by providing communication of the boundary data at each level of decomposition. See, for example, the works by Fridman et al. [11] and by Nielsen et al. [24]. To reduce the overhead caused by frequent inter-processor communication, Yang at el. [25] proposed to use boundary extensions in their DWT system configured from a cluster of SGI workstations. This, however, computes incorrect wavelet coefficients near data boundaries, which causes performance degradation in some applications, for example, low-bit rate image coding [36].

The systems and techniques of the present disclosure include an efficient DWT system design under memory and delay constraints achieved by reducing the memory and interprocessor communication required in the DWT based the segmentation of the input data in either sequential or for parallel architecture designs. Two parameters may be used to measure the performance of a DWT system design: the amount of data to be transmitted between processors (or to be stored in the processor if a sequential computation is used) and the number of times data has to be communicated between processors.

Figure 3:
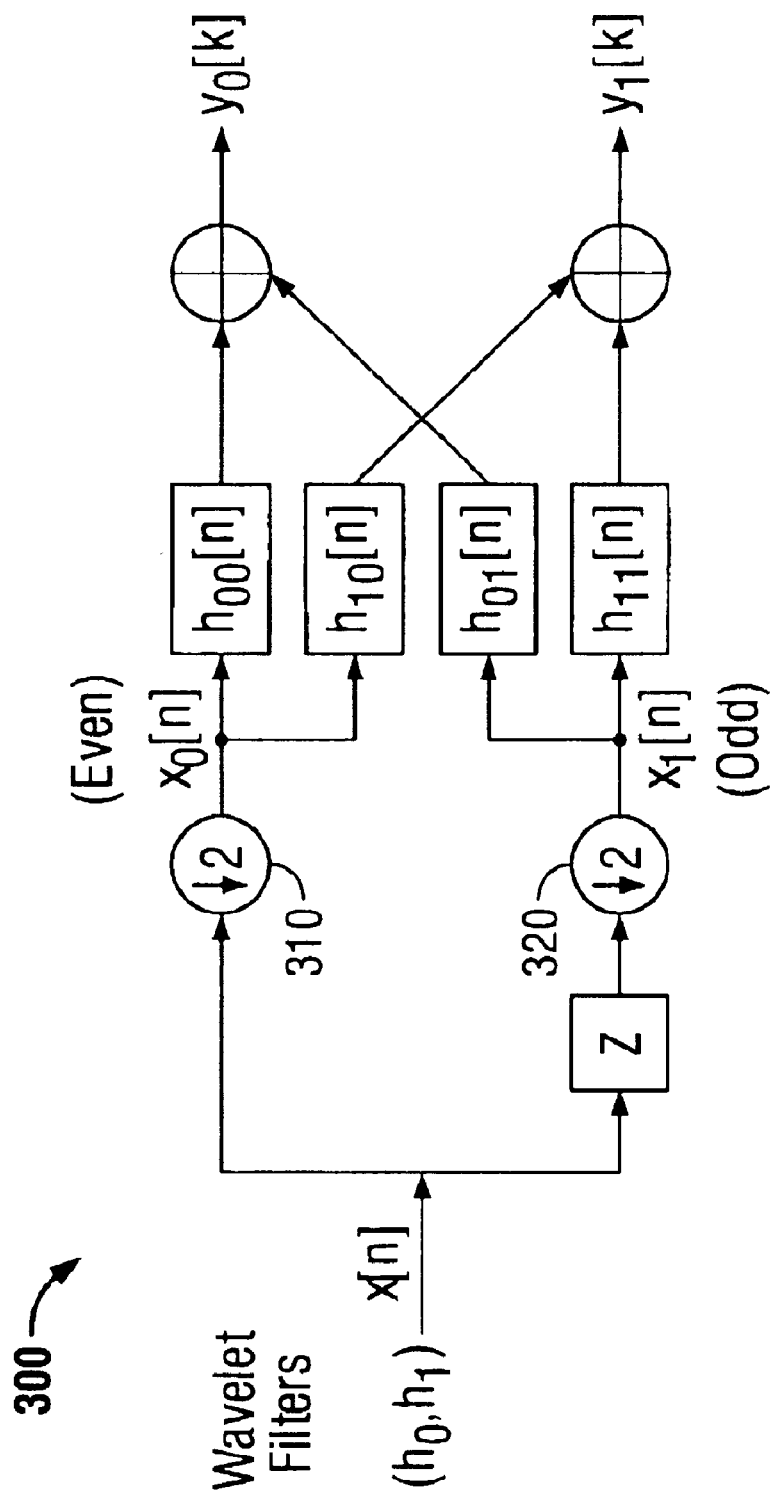
FIG. 3 shows one embodiment of a size-2 polyphase system that can efficiently perform the filterbank DWT algorithm of each filtering stage illustrated in FIG. 1.

FIG. 3 shows one embodiment of a size-2 polyphase system 300 that can efficiently perform the filterbank DWT algorithm of each filtering stage illustrated in FIG. 1. The input x[n] is downsampled by the dowmsamplers 310 and 320 to produce a sequence of even samples $x_0[n]$ and another sequence of odd samples $x_1[n]$. Filters h00, h10, h01, and h11 are then used to filter the signals $x_0[n]$ and $x_1[n]$ and two adders are used to produce the DWT outputs $y_0[k]$ and $y_1[k]$. The system 300 can be used as a building block to form a multistage DWT computation system.

The operation of the system 300 can be represented by a polyphase matrix form:

$$\begin{bmatrix} Y_0(z) \\ Y_1(z) \end{bmatrix} = \begin{bmatrix} H_{00}(z) & H_{01}(z) \\ H_{10}(z) & H_{11}(z) \end{bmatrix} \begin{bmatrix} X_0(z) \\ X_1(z) \end{bmatrix} \quad (1)$$

where $H_i(Z)$ is the ith polyphase component of the filter H(z)(similarly defined for G(z)). The 2×2 polynomial matrix representing the filtering operation can be factorized into a product of matrices, where each of the factoring matrices is either a prediction, an update or a scaling matrix. These correspond to a filtering implementation where prediction and updating filters alternate, and multiple stages of these prediction/update structures are cascaded. This representation converts the DWT computation by band-pass filtering and downsampling in multiple stages in FIG. 1 into a computation of updating the polyphase components, one stage at a time, over multiple updating stages. In the polyphase matrix form, this updating process can be expressed as:

$$\begin{bmatrix} X_0^{i+1} \\ X_1^{i+1} \end{bmatrix} = \begin{bmatrix} 1 & 0 \\ t_i(z) & 1 \end{bmatrix} \begin{bmatrix} X_0^i \\ X_1^i \end{bmatrix} \quad (2)$$

where $t_i(z)$ represents the updating filter at stage i. Since the input signal x[n] is divided into blocks to be processed either sequentially one at a time, or in parallel by two or more processors concurrently, updating the state values of the data near the boundaries of each block may require data from another adjacent block. Hence, when such data is not available at the time of updating operation, the DWT computations on certain cells are either partially performed or unperformed and hence are not fully updated.

One embodiment of this disclosure implements an overlap-state technique for the DWT computation to carry out all computations on the cells in a block based on the available data within that same block. Then, data from one or more adjacent blocks that is needed, including the partially updated samples, is transferred and the DWT computations in the unfinished cells are completed. The data to be transferred is the information of the cells in another block that overlap with the DWT computation of the current block.

Figure 4:
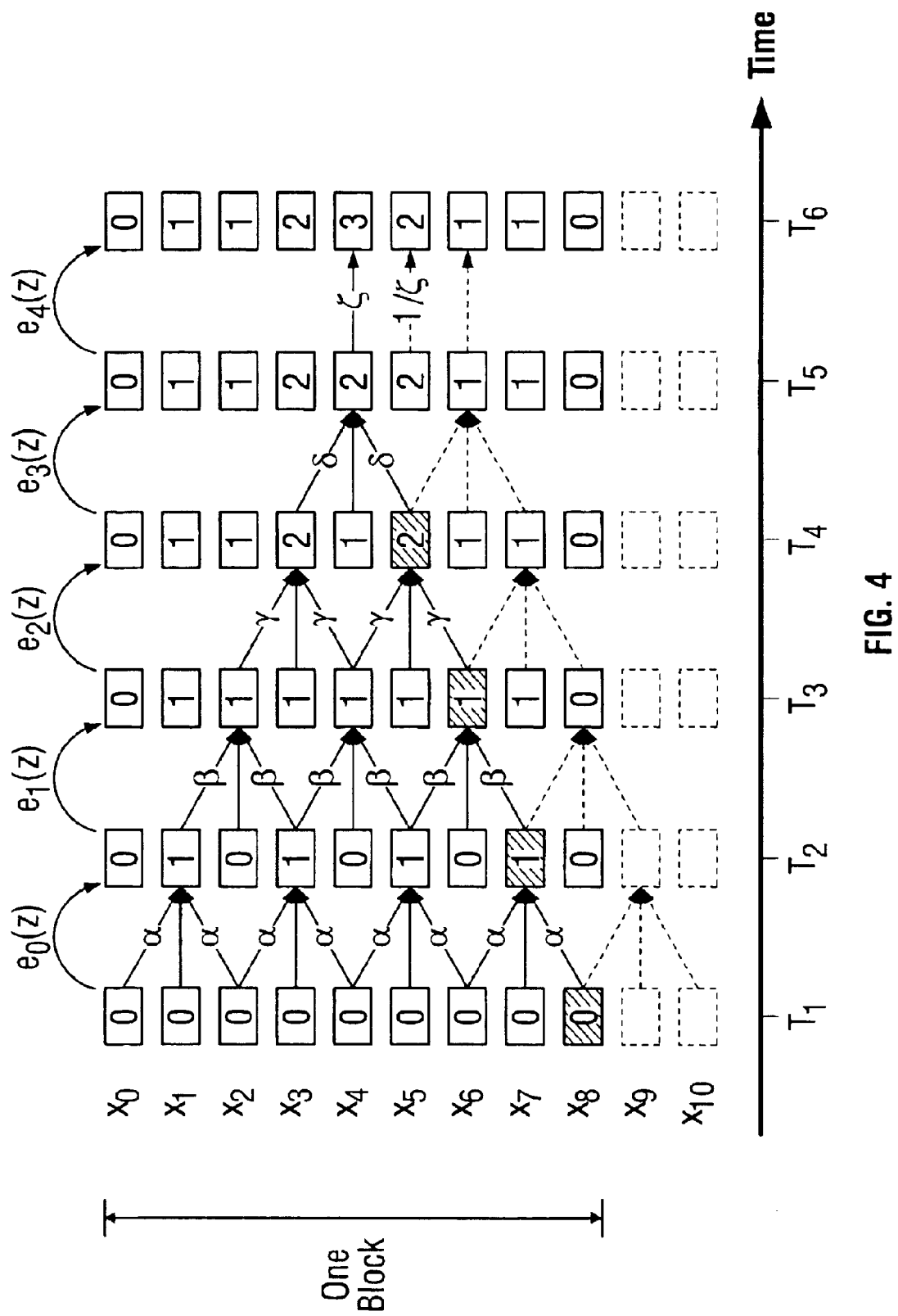
FIG. 4 shows the operation of the filtering system in FIG. 3 on a selected block where partially updated data is stored for further processing.

One aspect of the overlap-state technique is to keep the partially updated samples for data exchange with an adjacent block to complete the DWT computation. FIG. 4 shows the operation of the filtering system 300 on a selected block to illustrate the above situation. Assume that a block has nine samples, x0 through x8, and is to be updated at time t1. The box cells represent the memory cells in the computer, a storage device, or a circuit for the DWT processing. The numbers in the box cells represent the number of updates completed. Hence, "0" means no update is made to a cell, "1" means a cell is updated once, "2" means a cell is updated twice, and so on. Each update corresponds to having performed the computations corresponding to one of the component matrices of the factorization of the polyphase matrix. Solid lines with arrows represent DWT computations with sufficient data, dashed lines with arrows represent DWT computations that need data input from an adjacent block. Similarly, box cells of solid lines represent cells with sufficient input from cells within the block and box cells with dashed lines represent cells which require input from another block and therefore are never updated.

At time t2 after one computation cycle, the cells with odd-numbered samples are computed and updated. Only x1, x3, x5, and x7 cells are updated. Other cells remain unchanged. At time t3, even-numbered cells x2, x4, and x6 are updated, cells x1, x3, and x7 remain unchanged. Note that the computation on the cell x8 requires data from cells x9 and x10 from the next block. Lacking of a communication from the next block, this update computation cannot be performed. This process repeats. The states of all cells of the block at time t6 are shown in FIG. 4. Notably, only the cell x4 completed updated to produce the final DWT coefficient. Other cells still need input from other blocks to complete the DWT computation. The DWT computation based on the factorization technique shown in FIG. 3 will be explained in more detail in a subsequent section of this disclosure.

A number of advantages of this overlap-state technique are readily evident from the above description. The data exchange between different blocks is only carried out once at the end of the computation of each block. This simplifies the computation overhead associated with managing and performing the inter-block communication for data exchange. The memory needed for the DWT computation is minimized since only the data from another block required for the uncompleted DWT computation is stored. In addition, the overhead for performing and managing the data storage is minimized since only one data exchange is carried out. Other advantages and benefits can be appreciated from the more detailed description in the later section of this disclosure.

This overlap-state technique is in part based on a lifting framework formulated by Daubechies and Sweldens [33]. The DWT is first modeled as a finite state machine (FSM) using the lifting algorithm. Multilevel partial computations (intermediate states) are performed for samples near block boundaries. One aspect of this disclosure suggests that, to obtain a correct transform near data boundaries, these intermediate states can be preserved in their original storage spaces (an extension of the in-place computation feature of the lifting algorithm) and exchanged only once between neighboring data blocks for any arbitrary J level decompositions.

Figure 5:
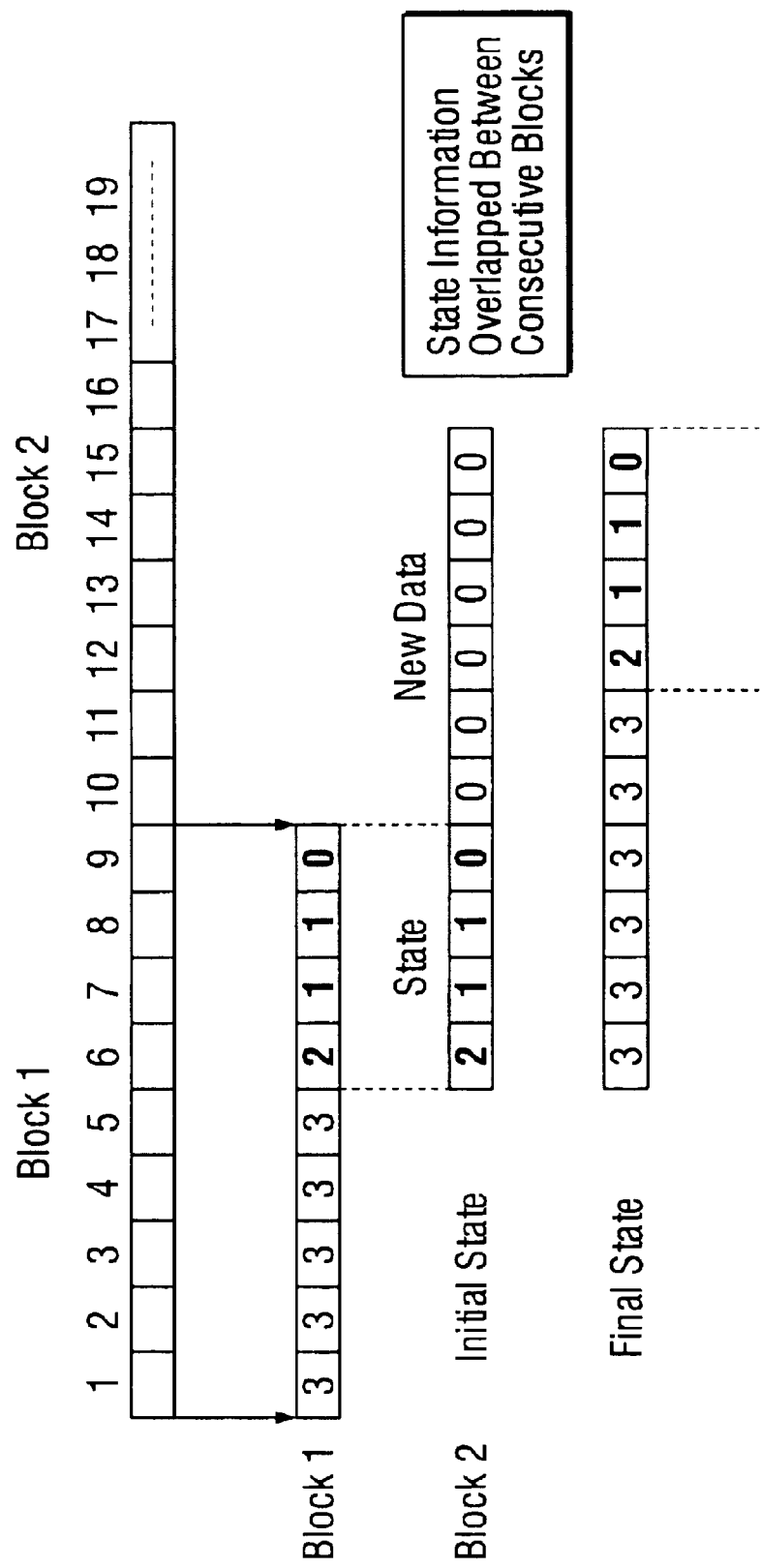
FIG. 5 shows one example of implementing the overlap-state technique in sequential DWT processing.

FIG. 5 shows one example of implementing the overlap-state technique in sequential DWT processing. The input signal is partitioned into non-overlapping blocks (Block 1, Block 2, etc.) each having 9 sequential data samples. The processor receives and processes the block 1 to complete the DWT computations for the first block wherein the first 5 cells are fully updated and the remaining 4 cells are not fully updated since the computations need data from the first two cells from the next block. Next, the processor is directed to form a new overlap-state block 2' which includes the unfinished cells 6 through 9 from the block 1 and new cells 10 through 15 from the block 2. The DWT computation is again carried out in this new block 2' where the cells 6 through 11 are completely updated and cells 12 through 15 are either partially updated or unchanged (e.g., cell 15 in the example). The above process repeats to compute the remaining samples in the input signal.

Figures 6A, 6B, 6C:
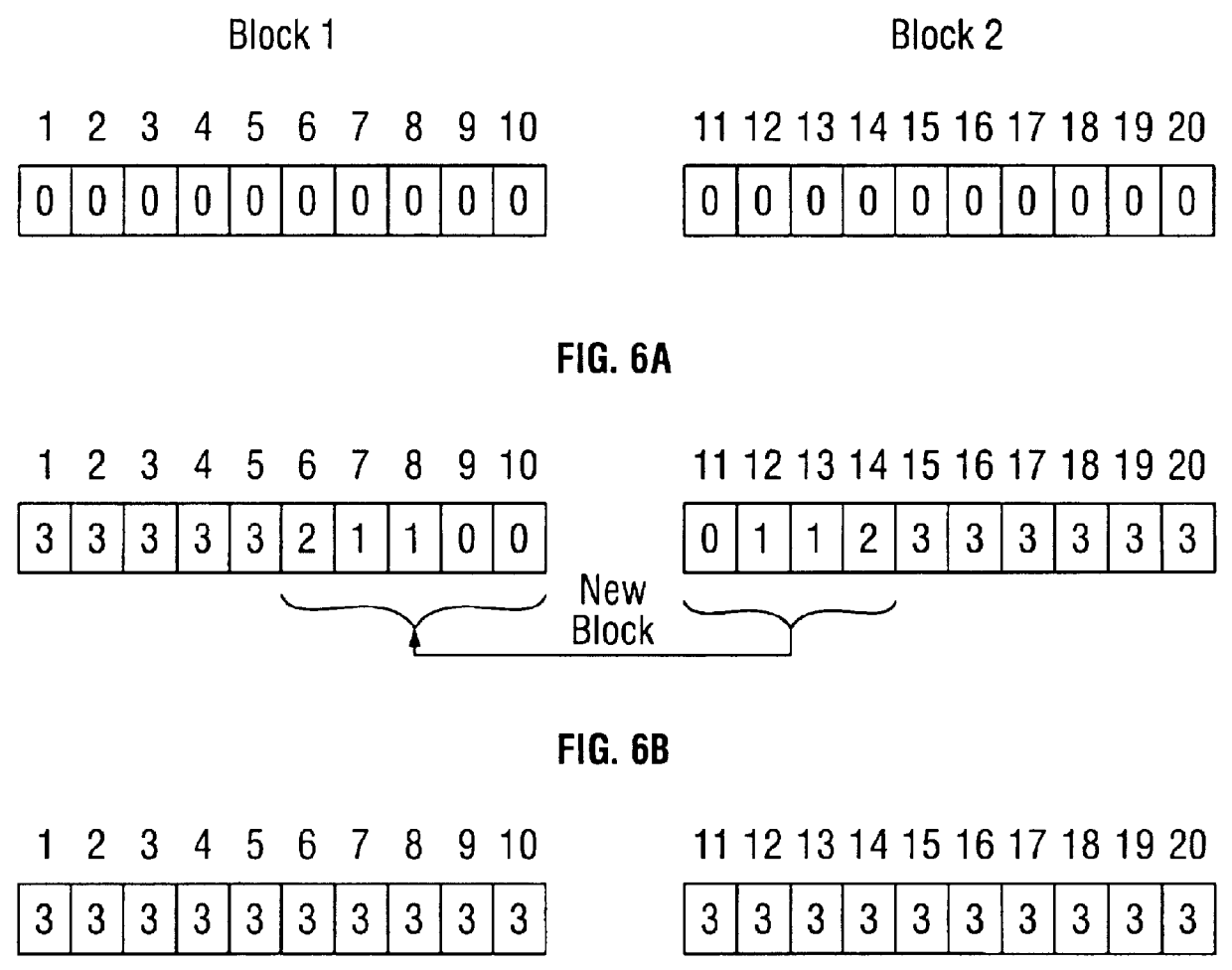
Figure 7:
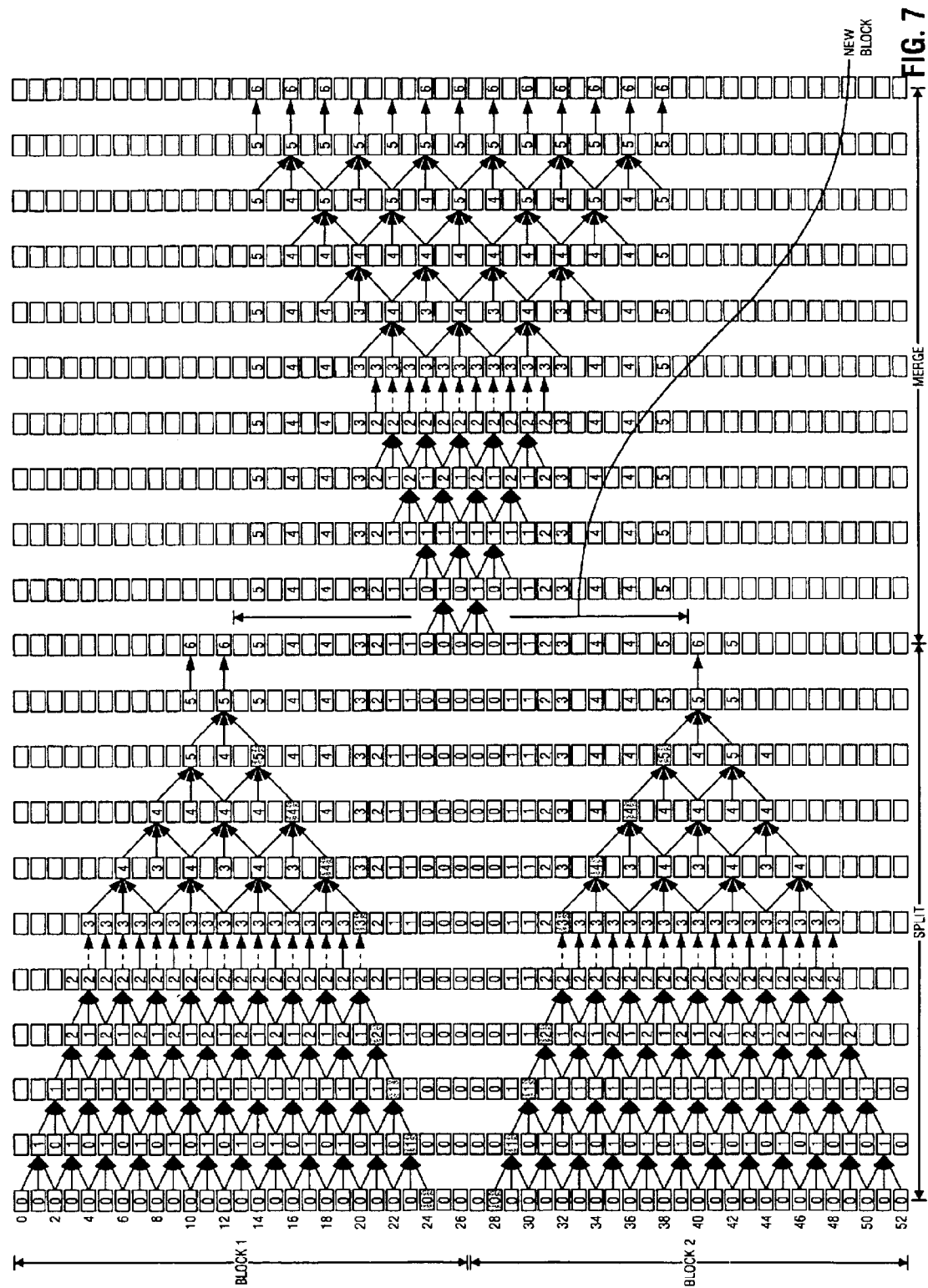
FIG. 7 illustrates a split and merge process in the parallel processing based on the overlap-state technique.

FIGS. 6A through 6C show one example of implementing the overlap-state technique in the parallel DWT processing by using two or more processors to operate simultaneously. In a two-processor parallel system, the processors are controlled to perform DWT computations on two sequential blocks, block 1 and block 2, at the same time by using only the data within each block, independently from another block. This stage of the DWT computation is referred to as the "split" stage where the independent DWT computations on different blocks are parallel and carried up to the desired decomposition level. After the completion of the split stage, the states of the cells in the blocks 1 and 2 are shown in FIG. 6B. The DWT computations on cells near the boundary between blocks 1 and 2 are not completed. Next, a communication between the two blocks 1 and 2 is performed and a new block is formed to merge the sequential unfinished cells from both blocks 1 and 2 together. Then the DWT computation is performed over this new block to complete the DWT computation. This second processing stage on the new block is referred to as the "merge" stage. FIG. 7 further illustrates this split and merge process in the parallel processing.

Notably, the present technique allows for partial computations for boundary samples at multiple decomposition levels and preserves these partially computed results (intermediate states) in their original locations in the memory for later processing. In addition, data exchange between different processors in parallel processing or between different sequential blocks in sequential processing is performed only after multilevel decompositions rather than at each decomposition level as in some other DWT systems.

The following sections provide more detailed description on exemplary implementations, various features, and associated benefits and advantages of the overlap-state technique.

I. Technical Issues in Sequential and Parallel DWT Processing

This section describes certain technical issues for DWT processing for one dimensional DWT processing in both sequential and parallel architectures. The issues and solutions can be extended to two-dimensional and other DWT sequential and parallel architecture designs.

A. Sequential Architecture Design

Figure 8:
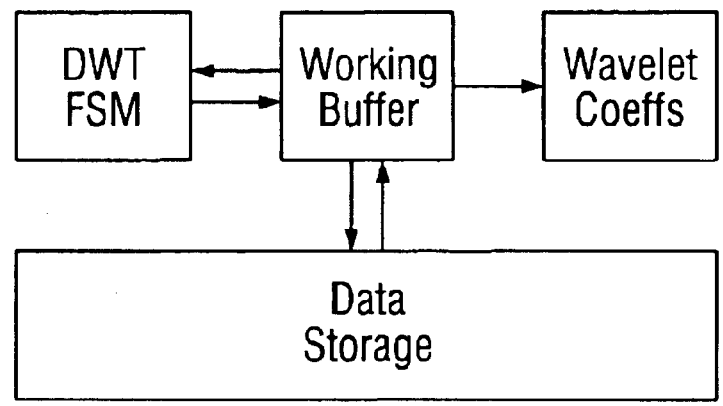
FIG. 8 shows a sequential system for 2D DWT.

A sequential system for 2D DWT is shown in FIG. 8. The transform working buffer (e. g., on-chip memory or cache memory) is usually small in size compared to the data size. Therefore the original data, stored in a secondary storage space (e.g., hard disk, frame buffer), has to be segmented such that each segment can be loaded to the working buffer and the transform can be computed one segment at a time. Variations of-this generic system include:

1. The block-based system presented in SSWT by Kossentini [28], which computes the wavelet transform one image block at a time.
2. The line-based system presented by Chrysafis et al. [12], [35], which computes the wavelet transform "on the fly" and where the basic input units are image lines.

FIG. 8 shows a typical sequential DWT system diagram. Assume blocks of size B (in bytes) are given to the processor, i.e., at most B bytes of input data can be loaded into the working buffer at a time. Define the overlap buffer size $B_s$, in bytes, as the memory space taken by the overlapped data which has to be kept in the working memory so that the correct transform can be computed for the next block of input data. In the case of the line-based systems [12], [35], $B_s$, is the minimum working buffer size needed for the transform. After transform of each block, only (B–$B_s$) bytes can be freed and wavelet coefficients generated can be transfered to the next processing stage, e.g. quantization. We now define the system efficiency η as $$\eta = \frac{B - B_s}{B} = 1 - \frac{B_s}{B}. \quad (3)$$

If η=1, this indicates that all of the original data samples can be fully transformed, which corresponds to the case of pure block transforms, such as DCT or the Haar transform. If, using the whole buffer, no complete decomposition can be performed (i.e., data is not enough for J-level of decompositions), then η=0. It is possible that some of the wavelet coefficients in high frequency bands can be generated.

The problem is formulated as: Given a fixed working buffer size B, how to compute the DWT to maximize the system throughput η? Obviously, to increase the system throughput, one has to reduce the overlap buffer size $B_s$ as much as possible.

B. Parallel Architecture Design

Figure 9A:
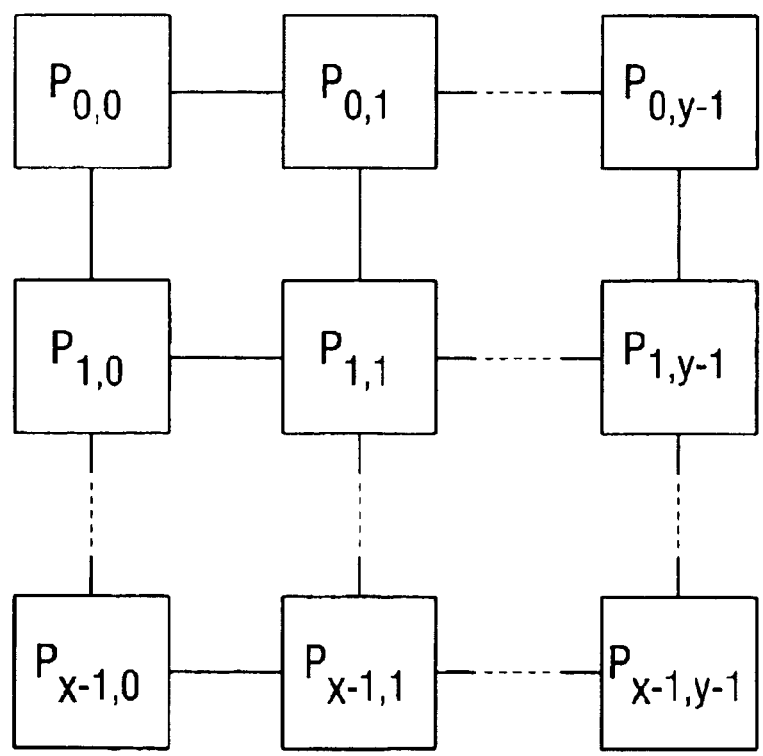
FIG. 9A shows a 2D mesh processor network of multiple processors.
Figure 9B:
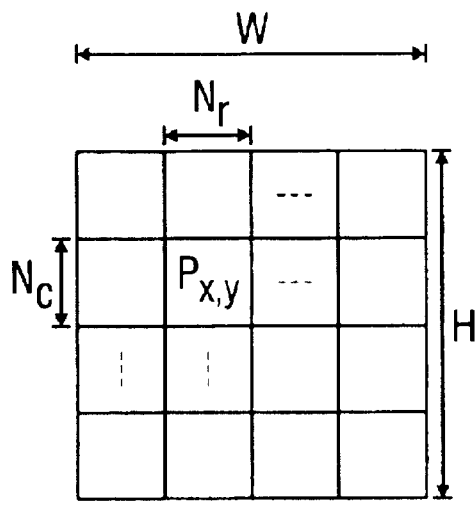
FIG. 9B shows one block partition of data for 2D data.

FIG. 9A shows a 2D mesh processor network of multiple processors. In this example, each processor is only connected with its immediately neighboring processors. Communications between processors can be established according to the single port model, in which processors may only send or receive a message over one communication link at a time, or the multi-port model, in which a processor may send or receive multiple messages over multiple links at a time. In this model, the natural partition for 2D data is the block partition strategy shown in FIG. 9B. The processor $P_{m,n}$ is allocated with input samples with indices (x,y), $mN_r \leq x \leq (m+1)N_r$, $mN_c \leq y \leq (m+1)N_c$. Without loss of generality, assume $W=MN_r$ and $H=NN_c$, where ($N_r$, $N_c$) are the block row and column length, and (M,N) are the number of processors in row and column direction respectively.

Figure 10A:
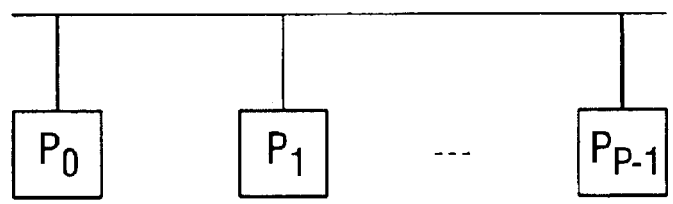
FIG. 10A shows bus processor network of processors.
Figure 10B:
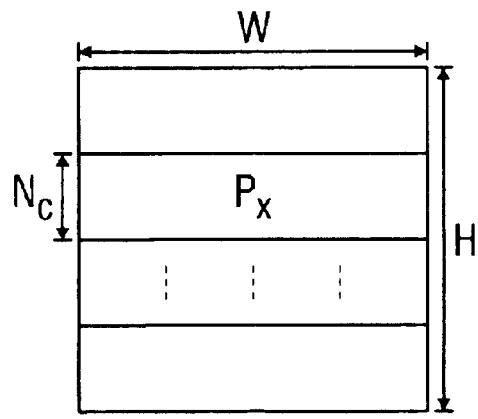
FIG. 10B shows one embodiment of the strip partition for the 2D data.

FIG. 10A shows bus processor network of processors. A common bus is used to allow a processor to communicate with every other processor. An example is the LAM (Local Area Multicomputer) system, where locally connected machines are reconfigured into a parallel system. One possible data partitioning approach is the strip partition which is depicted in FIG. 10B where processor P, is allocated with input samples of indices (x,y), $0 \leq x \leq W-1$, $Nn_c \leq y \leq (n+1)N_c$.

The message passing mechanisms in both processor networks are modeled as follows. The communication time $T_c$ for a size-m message is $$T_c = t_s + m t_w + t_p \quad (4)$$

where $t_s$ is the time it takes to establish a connection, $t_p$ is the propagation time, and $t_w$, is the time to transmit a size-1 message. If one message unit is an integer, then $t_w$, is the time to transmit one integer. Other cases are defined similarly. Notice that for the bus processor network, $t_p$, is taken as the average propagation time and, for the mesh processor network, $t_p = 1 t_h$ where 1 is the number of links and $t_h$ is the propagation time over one link.

The design problem is formulated as: Given the communication model as defined above, minimize the communication overhead in a parallel DWT system. To this end, clearly we can reduce the overhead by reducing the number of communications and/or reducing the amount of data that has to be exchanged.

II. DWT Processing-Lifting Factorization

This disclosure is presented based on the tree-structured [29] multilevel octave-band wavelet decomposition system with critical sampling using a two-channel wavelet filterbank. The present techniques can be extended to many other DWT systems, including but not limited to, systems of standard DWTs [41], multichannel wavelet filterbanks, and wavelet packet decompositions.

A. The Standard Algorithm

Theoretically [42], the wavelet transform is a signal decomposition technique which projects an input signal onto a multiscale space constructed from the dilated and translated versions of a prototype wavelet function, i.e., the mother wavelet. Computationally most wavelet transforms can be implemented as recursive filtering operations using the corresponding wavelet filterbank as shown in FIG. 1. This implementation will be referred to as the standard algorithm hereafter. We emphasize that the filtering operations are only performed every other sample for two-channel filterbanks, i.e., a subsample-filtering approach, which is already a fast algorithm [6]. The pseudo code implementation is given in Table I.

TABLE 1

THE STANDARD ALGORITHM.

input: x[π], n∈[0, N]
    N: input sequence length
    J: decomposition level
    L: filter length
output: y[k], k∈[0, N]
begin
    for (j = 0; j < J; j++)
    for (π = 0; n < $2^{J-j}$; n++)
    {

$$x^j(n) = \sum_{m=0}^{L-1} x^{j-1}[m] h[2n - m]$$

$$y^j(n) = \sum_{m=0}^{L-1} x^{j-1}[m] g[2n - m]$$

}
end

For practical applications with memory and delay constraints, the standard algorithm, however, may not be a good choice for three reasons: (i) it requires a buffer of same size as the input to store the intermediate results (the lowest subband) for recursive filtering operations; (ii) it has a large latency since all the outputs of one subband are generated before the output of the next subband; and (iii) the computation cost is high. Define algorithm computation cost as the number of multiplications and additions per output point. Using wavelet filters with L-taps, L multiplications and (L–1) additions are needed for one output point at each level. The cost Cs of the standard algorithm, for a J-level wavelet decomposition, can be computed as [6]

$$C_M^J = (L+L-1)(1+\tfrac{1}{2}+\tfrac{1}{4}+\ldots+\tfrac{1}{2}^{J-1}) = 2(2L-1)(1-2^{-J}) \quad (5)$$

B. The Lifting Algorithm

A size-N polyphase transform [42] of a signal x[n] is defined as a mapping that generates N subsequences with each being a shifted and downsampled version of x[n], i.e., $x_i[n]=x[nN+i]$. These subsequences are called the polyphase components of signal $x[n]$. In the case of $N=2$, this transform simply divides the input sequence into two polyphase components which consist of samples from the original sequence having odd indices and even indices, respectively. In z-transform domain, the polyphase representation of $x[n]$ is $$X^i = \sum_{i=0}^{N-1} z^{-i} \qquad (6)$$

The DWT computation in the polyphase domain is expressed by Equation (1), where the 2×2 polyphase matrix is $P(z)$.

Figure 11:
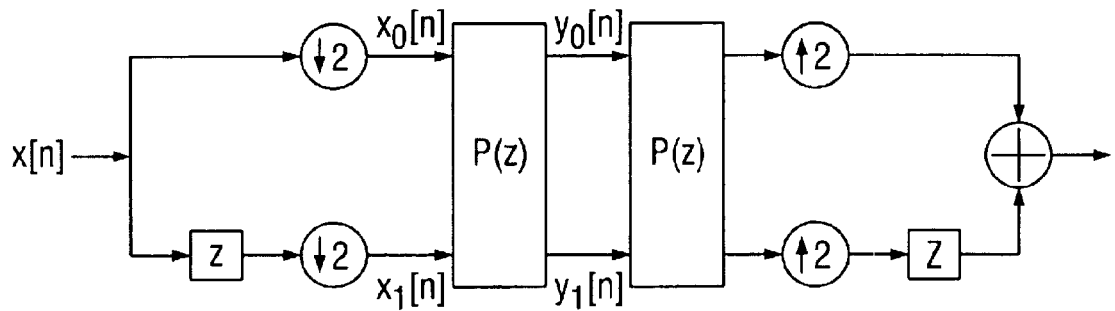
FIG. 11 shows one embodiment of a two-channel filterbank where the left side is the decomposition stage and the right side is the reconstruction stage.

FIG. 11 shows one embodiment of a two-channel filterbank where the left side is the decomposition stage and the right side is the reconstruction stage. If the determinant of $P(z)$ is a monomial, i.e., $\det(P(z))=z^1$, then X can be losslessly reconstucted as $X=P^{-1}(z)Y$ with a phase shift. In this case, the corresponding filters will be called perfect reconstruction (PR) wavelet filters.

One advantage of the polyphase domain transform computation is that the polyphase matrix $P(z)$ can be further factored and the factorization leads to fast DWT algorithms [30], [31], [32], [33]. Using the Euclidean algorithm, Daubechies and Sweldens [33] have shown that the polyphase matrix $P(z)$ of any PR FIR filterbank can be factored into a product form of elementary matrices as $$P(z) = \prod_{i=1}^{m} \begin{bmatrix} 1 & s_i(z) \\ 0 & 1 \end{bmatrix} \begin{bmatrix} 1 & 0 \\ t_i(z) & 1 \end{bmatrix} \begin{bmatrix} K & 0 \\ 0 & 1/K \end{bmatrix} \qquad (7)$$

where $s_i(t)$, $t_i(t)$ are the prediction and updating filters, respectively, at stage i. It has been shown that such a lifting-factorization based DWT algorithm is, asymptotically for long filters, twice as fast as an implementation based on the standard algorithm (Theorem 8 in [33]).

Figure 12A:
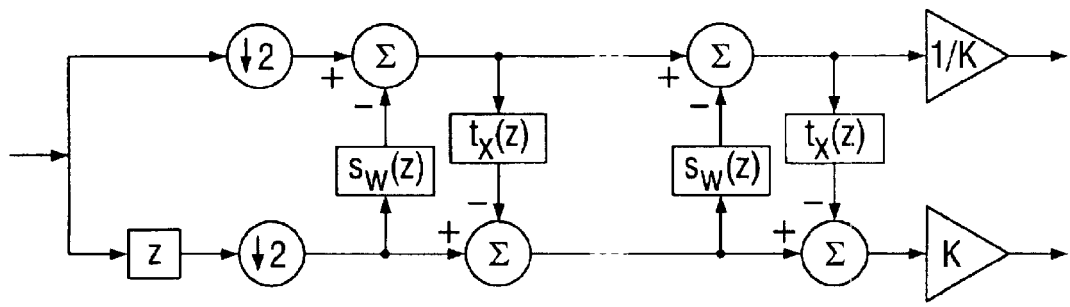
FIGS. 12A and 12B show the forward and inverse DWT using lifting factorization.
Figure 12B:
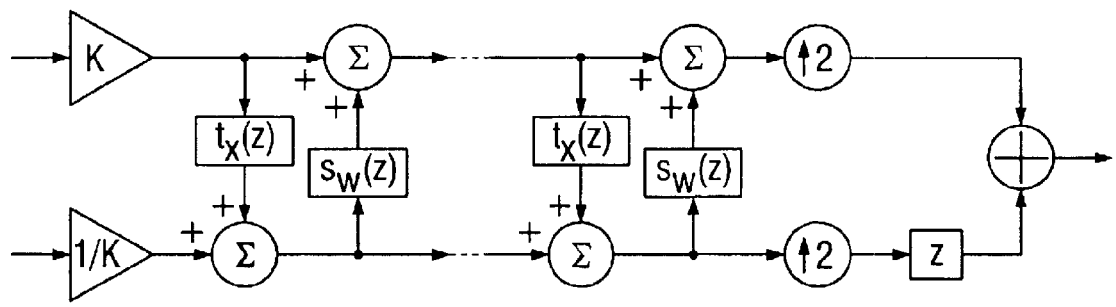

FIGS. 12A and 12B show the forward and inverse DWT using lifting factorization.

The elementary matrices in the lifting factorization are all triangular (upper or lower triangular) with constants in the diagonal entries. Such a choice of elementary matrices enables the implementation of the DWT to be in-place (see next section for details), a key difference with respect to other types of factorizations (e.g., the lattice factorization). While all these factorizations can reduce the DWT computation, the in-place feature can also reduce the transform memory. Consequently, the lifting algorithm is chosen as the baseline DWT algorithm for our proposed architecture designs.

C. Practical DWT System Design

For practical DWT system design under memory and delay constraints, choosing only a fast algorithm (e.g. the lifting algorithm) may not be sufficient. First, the complexity of the lifting algorithm is still linear with the size N of the input data, i.e., O(N). If a parallel system is used to further speed up the computation, the first problem to solve is that of establishing an efficient sharing of data across processors so that the correct transform can be computed at the boundaries. Second, though the in-place feature of the lifting algorithm eliminates the need for a buffer to store intermediate results, it does not address the problem of extra buffer requirement when the input data has to be transformed on a block-by-block basis.

The boundary processing in DWT is illustrated in FIG. 2. When the filter (length L) moves to the right boundary of block 1, it needs input data samples from block 2. In a sequential architecture, blocks 1 and 2 do not reside in memory at the same time. In a parallel architecture, blocks 1 and 2 are allocated to different processors. FIG. 2 shows the DWT operation near block boundaries for one level decomposition. Obviously, extra buffer or communication is needed to ensure correct computations near data block boundaries. Such a problem also exists in cases of conventional linear filtering of long data sequences and can be dealt with by using either overlap-add or overlap-save techniques. However, because the DWT consists of recursive filtering operations on multilevel downsampled data, direct applications of these two existing techniques may increase significantly the cost in terms of memory and/or communication.

Consider a J-level wavelet decomposition with block size N and filter length L. Both overlap-add and overlap-save approaches require an extra buffer (for boundary filtering operations) of size L–2 for each level of decomposition. If the overlap is done once for all decomposition levels (the SSWT approach by Kossentini [28]), the total overlap buffer size is $(2^J-1)(L-2)$ which increases exponentially with J. This can become significant if deep decomposition and long wavelet filters are used. An alternative is to overlap at each level. In this case, the overlap buffer size is $J(L-2)$ for J-level decompositions. This, however, causes delay in parallel architectures since one processor has to wait the other to send new data after each level of decomposition (an approach described in [11], [24]). A third approach [25], [21] is to use boundary extension (e.g. symmetric extension) to approximate the data in the neighboring blocks. This completely eliminates the overlap buffer and also eliminates the communication for data exchanges between processors. Unfortunately, the DWT coefficients near block boundaries are computed incorrectly.

The above analysis thus shows the inefficiencies, in terms of memory and/or communication overhead, of DWT system designs that adopt various overlapping techniques. The overlap-state technique of the present disclosure is designed in part to overcome some of the inefficiencies in these and other techniques. The overlap-state technique performs the DWT computation across block boundaries to reduce the communication overhead in parallel architectures and the overlap buffer size in sequential architectures.

III. The Overlap-State Technique

Various aspects of the overlap-state technique for DWT computation are described in more detailed in the following.

A. The Finite State Machine Model

From the lifting point of view [43], [33], the elementary triangular matrices in the factorization in Equation (7) can be further classified as prediction/lifting and updating/dual lifting operations respectively. From a computational point of view, however, there is no big difference among these elementary matrices, each of which essentially updates one polyphase component at a time using linear convolutions.

Without loss of generality, a notation $e^i(z)$ to represent the elementary matrices. That is, $$e^i(z) = \begin{bmatrix} 1 & 0 \\ t_i(z) & 1 \end{bmatrix} \text{ or } e^i(z) = \begin{bmatrix} 1 & s_i(z) \\ 0 & 1 \end{bmatrix}$$

Let the input be $X(z)$, with polyphase representations denoted $X(z)=[X_0(z) X_1(z)]^t$ in the frequency domain and $x(n)=[x_0(n)x_1(n)]^t$, in the time domain. Now define the intermediate states in the process of transformation, $\{X^i(z), i=0, 1, \ldots, 2m+1\}$, as $$X^i(z) = e^{i-1}e^{i-2} \ldots e^0 X(z) \quad (8)$$

$$= \prod_{j=i-1}^{0} e^j(z)X(z)$$

$$= e^{i-1}(z)X^{i-1}(z)$$

where $X^i(z)$ is the resulting signal after the first i elementary matrices have been applied. Consider one lifting stage using a lower triangular elementary matrix $e^i(z)$ to update $X^i(z)$ into $X^{i+1}(z)$ as follows:

$$\begin{bmatrix} X_0^{i+1}(z) \\ X_1^{i+1}(z) \end{bmatrix} = \begin{bmatrix} 1 & 0 \\ t^i(z) & 1 \end{bmatrix} \begin{bmatrix} X_0^i(z) \\ X_1^i(z) \end{bmatrix} \quad (9)$$

$$= \begin{bmatrix} X_0^i(z) \\ X_1^i(z) + e^i(z)X_0^i(z) \end{bmatrix}$$

In this transformation step, the polyphase component $X_0{}^i(z)$ is unchanged while the polyphase component $X_1{}^i(z)$, is updated by adding a quantity computed from the other polyphase component. In time domain, this means that all even samples are preserved while all odd samples are updated. For an input vector X of size N (assuming N even), the state transition can be written as $$\begin{bmatrix} x^{i+1}(0) \\ x^{i+1}(1) \\ x^{i+1}(2) \\ x^{i+1}(3) \\ \vdots \\ x^{i+1}(2k) \\ x^{i+1}(2k+1) \\ \vdots \\ x^{i+1}(N-2) \\ x^{i+1}(N-1) \end{bmatrix} = \begin{bmatrix} x^i(0) \\ x^i(1)+\sigma(1) \\ x^i(2) \\ x^i(3)+\sigma(3) \\ \vdots \\ x^i(2k) \\ x^i(2k+1)+\sigma(2k+1) \\ \vdots \\ x^i(N-2) \\ x^i(N-1)+\sigma(N-1) \end{bmatrix} = \begin{bmatrix} x^i(0)+\sigma(0) \\ x^i(1)+\sigma(1) \\ x^i(2)+\sigma(2) \\ x^i(3)+\sigma(3) \\ \vdots \\ x^i(2k)+\sigma(2k) \\ x^i(2k+1)+\sigma(2k+1) \\ \vdots \\ x^i(N-2)+\sigma(N-2) \\ x^i(N-1)+\sigma(N-1) \end{bmatrix} \quad (11)$$

Let $t^i(z) = \sum_{n=-a_i}^{b_i} t^i_n z^{-n}$ ($a_i \geq 0$, $b_i \geq 0$), then the updating quantity $\sigma(n)$ can be computed as $$\sigma(n) = \begin{cases} 0 & n = 2k \\ \sum_1 t^i_1 x^i_0(k-1) & n = 2k+1 \end{cases} \quad (12)$$

If e(z) is upper triangular, then odd samples are unchanged and even samples are updated. In this case, denote $s^i(z) = \sum_{n=-a_i}^{b_i} s^i_n z^{-n}$, then the updating quantity $\sigma(n)$ for upper triangular matrix e(z) is $$\sigma(n) = \begin{cases} \sum_1 s^i_1 x^i_1(k-1) & n = 2k \\ 0 & n = 2k+1 \end{cases} \quad (13)$$

An important observation is that only one polyphase component is updated at each state transition and the updating quantity $\sigma(n)$ only depends on samples from the other polyphase component. When updating even samples, only odd samples are needed and vice versa. This leads to the following three conclusions for states updating at each stage:

1. Whenever $X^i$ is updated into $X^{i+1}$, there is no need to keep the old value of $X^i$ since no other updating will need it any more. In other words, every time $X^i$ is generated, only this set of values need be stored, i.e., we do not need to know any of the previous values $X^j$ (j<I), in order to compute the final wavelet coefficients.

2. The updated value of each sample $x^{i+1}(n)$ can be stored in the same memory space allocated for $x^i(n)$ since the old value $x^i(n)$ does not contribute to the updating of its neighbors and any later stage updating. For example, $x^i(1)$ can be over-written by $x^{i+1}(1)$ without affecting the updating of $x^i(3)$. This is the so-called in-place property of the lifting algorithm. Then, to transform a block of size of N, only a buffer of size N is needed while the standard algorithm needs a buffer of size 2N, where memory of size N is needed for the original input and the remaining N is needed for the transform outputs.

3. The updating of each sample $x^i(n)$ can be implemented independently from the updating of other samples. That is, there is no ordering of the updating between samples. For example, one can update $x^i(3)$ before or after the updating of $x^i(1)$ and obtain the same result.

Figure 13:
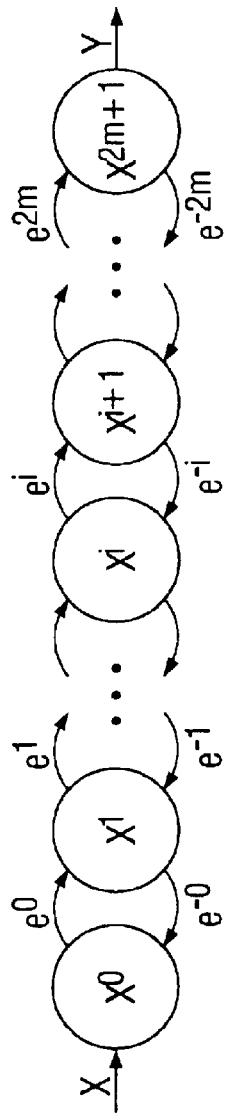
FIG. 13 is a schematic plot of the DWT as a finite state machine (FSM).

For the polyphase matrix factorization, the necessary and sufficient condition for the above properties is that the elementary matrix $e^i(z)$ can only be in the form of lower/upper triangular matrices with constants on the diagonal entries. This key property of the lifting factorization guarantees that the DWT can be computed in-place. That is, each raw input data sample x(n) (initial state) is progressively updated into a wavelet coefficient (final state) using samples in its neighborhood. Thus the wavelet transform based on the polyphase factorization can be modeled as a finite state machine (FSM) in which each elementary matrix $e^i$ updates the FSM state $X^i$ to the next higher level $X^{i+1}$. The forward wavelet transform Y(z) can be written as $$Y(z) = P(z)X(z) \quad (14)$$

$$= \prod_{i=2m}^{a} e^i(z)X(z)$$

$$= e^{2m}(z) \cdots e^1(z)\underbrace{\underbrace{e^a(z)X^a(z)}_{X^1(z)}}_{\underbrace{X^2(z)}_{Y(z)=X^{2m+1}(z)}}$$

and the corresponding inverse transform is $$\dot{X}(z) = P^{-1}(z)Y(z) \quad (15)$$

$$= \prod_{i=0}^{2m} e^{-i}(z)Y(z)$$

$$= e^{-0}(x) \cdots e^{-2m+1}(z)\underbrace{\underbrace{e^{-2m}(z)X^0(z)}_{X^{2m}(z)}}_{\underbrace{X^{2m-1}(z)}_{\dot{X}(z)=X^0(z)}}$$

where $e^{i-1}(z)$ is the inverse of $e^i(z)$. The schematic plot of the DWT as a FSM is depicted in FIG. 13.

B. Overlap-State

Assume there are M elementary matrices $\{e^i, i=0, 1, \ldots, M-1\}$ in the factorization of the polyphase matrix P(z), then there are a total of M states in the FSM defined above. The FSM modeling suggests that, to compute the transform, each and every sample x(n) has to complete its state transitions from state 0 up to state M−1 sequentially. This means that one has to compute the updating quantities $\{\sigma^i(n)$, i=0, 1, ..., M−1} as in Equations (13)and (14) at all these stages. Unfortunately this cannot be accomplished for samples near block boundaries when the input has to be transformed on a block-by-block basis, due to buffer size limitation, or when parallel processing is used.

Figure 14A:
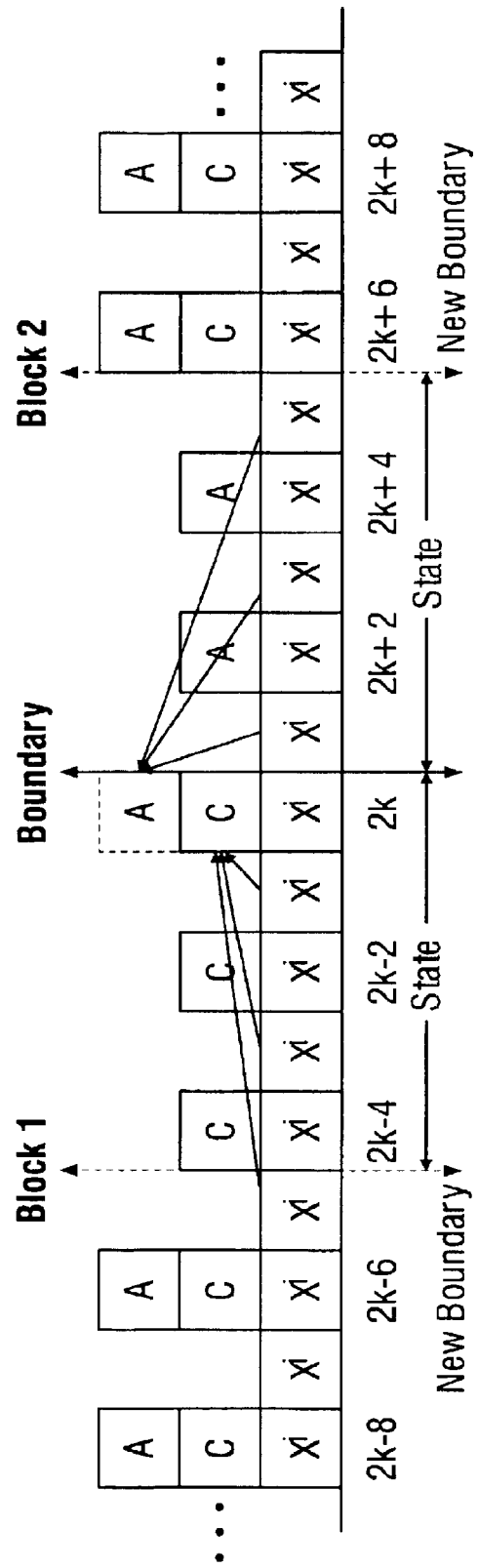
FIGS. 14A and 14B illustrate state transitions across a block boundary of blocks 1 and 2.
Figure 14B:
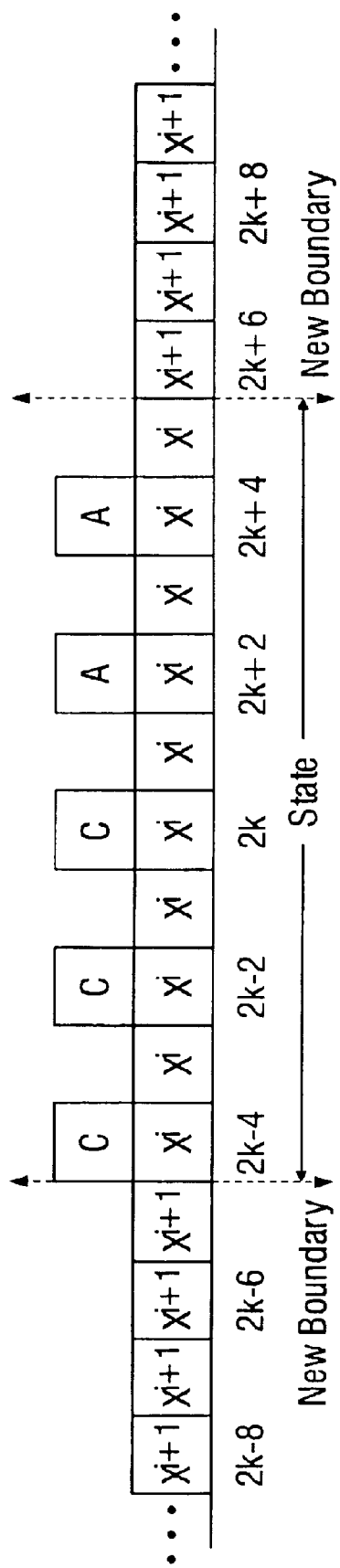
Figure 15A:
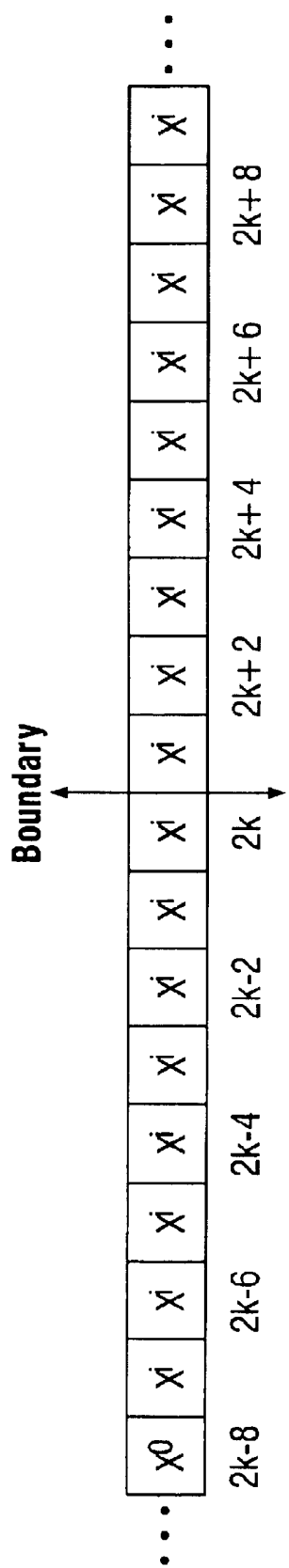
FIG. 15 illustrates one example of the overlap-state processing in the sequential DWT, where the state in (a) is the input in initial state i, the Block 1 in (b) includes samples up to $x^i$ (2m), partially updated samples are shown to be overlapped with next block of input samples in (c), and the completely transformed/updated input from state i to i+1 is shown in (d).
Figure 15B:
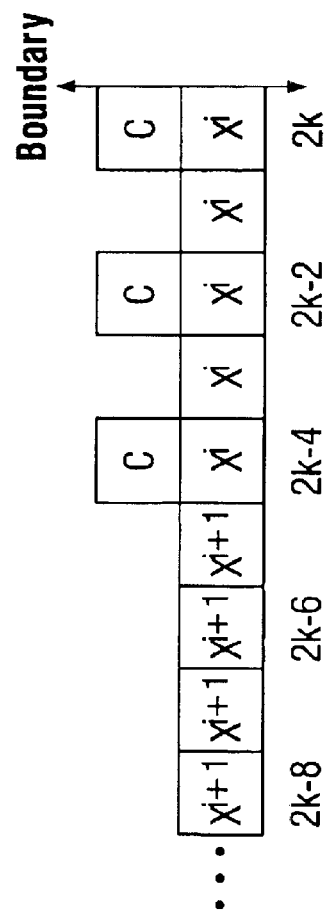
Figure 15C:
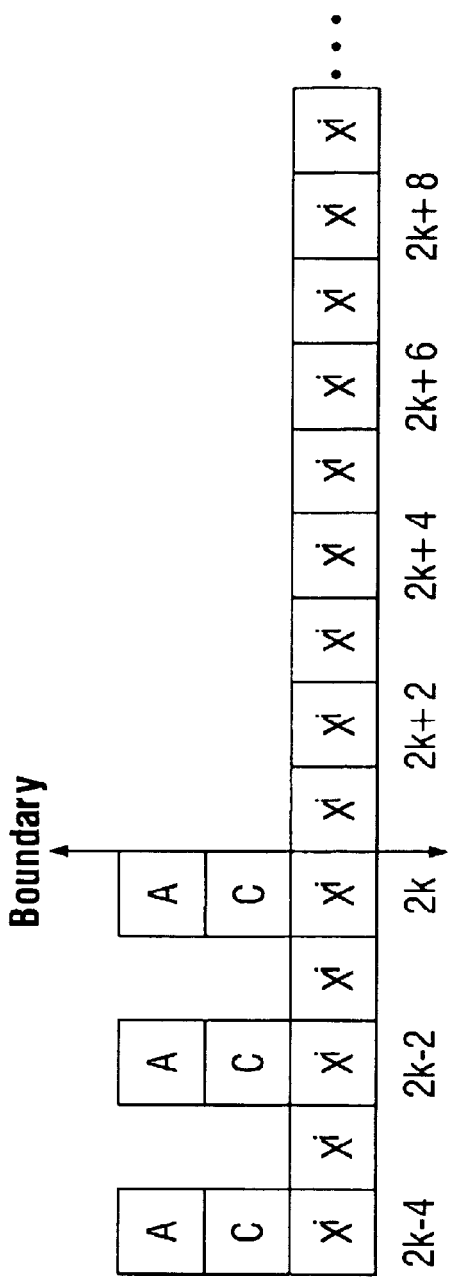
Figure 15D:
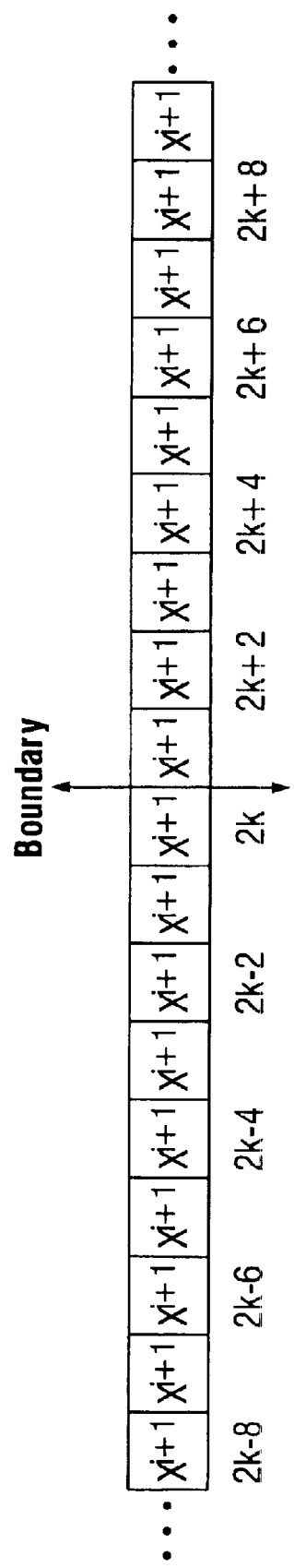

Consider one operation across a data boundary between two blocks using an upper triangular elementary matrix. Let the current state be i and the input sequence $x^i(n)$ be segmented at point 2k (FIGS. 14A and 14B). In this state transition, even-indexed samples are updated using odd-indexed samples, The updating quantity $\sigma(2k)$ is $$\delta(2k) = \sum_l s_l^i x_l^i(k-1) \qquad (16)$$

$$= \sum_l s_l^i x_l^i(2k - 2l + 3)$$

$$= \underbrace{\sum_{l=-a^1}^{-1} s_l^i x_l^i(2k - 2l + 1)}_{C(2k)} \underbrace{\sum_{l=0}^{a^1} s_l^i x_l^i(2k - 2l + 1)}_{A(2k)}$$

where C(2k) and A(2k) are the contributions from the causal and anti-causal parts of filter $s^i(z)$, respectively.

FIGS. 14A and 14B illustrate state transitions across a block boundary of blocks 1 and 2 using $e^i$ with $a^i=3$ and $b^i=2$. FIG. 14A show the partial computations near boundaries. FIG. 14B shows that boundary samples stay in intermediate states after updating. The "new boundary" separates fully updated output coefficients from partially computed ones. Thus, C(2k) and A(2k) for the samples near the block boundary cannot be computed due to the segmentation. As a result, $\sigma(2k)$ will not be available. These samples cannot be updated into state i+1. FIG. 14A shows, for example, $x^i(2k)$ in block 1 cannot be updated into $x^{i+1}(2k)$ since $\{x^{i+1}(2k+1), x^{i+1}(2k+3), x^{i+1}(2k+5)\}$ are in the block 2 and thus are not available at the time block 1 is transformed.

Consequently, $\sigma(2k)$, the updating factor for sample $x^i(2k)$ cannot be computed to obtain the updated $x^{i+1}(2k)$. Rather than leaving $x^i(2k)$ in state i, it is partially updated as $x'^i(2k)=x^i(2k)+C(2k)$ in the present overlap-state technique since C(2k) can be computed from the causal neighborhood as a function of $\{x^i(2k-1), x^i(2k-3), x^i(2k-5)\}$. The significance of this partial updating is that one can free all the samples in the causal past for future processing and save memory. In this case, samples $\{x^i(2k-1), x^i(2k-3), x^i(2k-5)\}$ do not need to be buffered for the fully updating of $x^i(2k)$ since their contribution C(2k) has already been added to the partially updated $x'^i(2k)$ in the form of $x^i(2k)+C(2k)$. On the other hand, if $x^i(2k)$ is not partially updated, then $\{x^i(2k-1), x^i(2k-3), x^i(2k-5)\}$ have to be buffered. The same partial updating happens also for samples $\{x^i(2k-2), x^i(2k-4)\}$ in the left block and samples $\{x^i(2k+2), x^i(2k+4)\}$ in the right block.

The complete state transition from i to i+1 requires buffering the following samples in each block:

1. Partially updated samples such as $\{x'^i(2k), x'^i(2k-2), x'^i(2k-4)\}$ in the left block and $\{x'^i(2k+2), x'^i(2k+4)\}$ in the right block.
2. Contributing samples required by partially updated samples (in the other block) to complete the transform, such as $\{x^i(2m-1), x^i(2m-3)\}$ in the left block and $\{x^i(2m+1), x^i(2m+3), x^i(2m+5)\}$ in the right block.

Notice that these partially updated samples are not exactly the state information as defined before in the FSM definition. For simplicity, however, these partially updated samples and contributing samples will be all called the state information hereafter. Obviously, as long as the state information is preserved at each stage, the transform can be completed at any later time. That is exactly what a FSM is supposed to do.

Such a later processing is possible because partial updating in the right block for updating $\{x^i(2m+2), x^i(2m+4)\}$ can be implemented independently from the partial updating of $\{x(2m), x^i(2m-2), x^i(2m-4)\}$ in the left block. The partial updating does not remove any information needed by the other block, since it updates samples that are not inputs at the i-th state transition stage. The end state after application of $e^i$ is shown in FIG. 14B. Because partially updated samples cannot be used for processing, the size of the segment over which can be computed is reduced, so that the effective boundary is now reached before sample $x^{i+1}(2k-4)$ in block 1 and sample $x^{i+1}(2k+6)$ in block 2. Effectively, the physical boundary splits into two and extends inwards in both blocks. The next state transition via $e^{i+1}$ will operate only on samples in state i+1. All the samples between the two new boundaries become the state information and the same procedure repeats at each state transition stage.

Figure 16C:
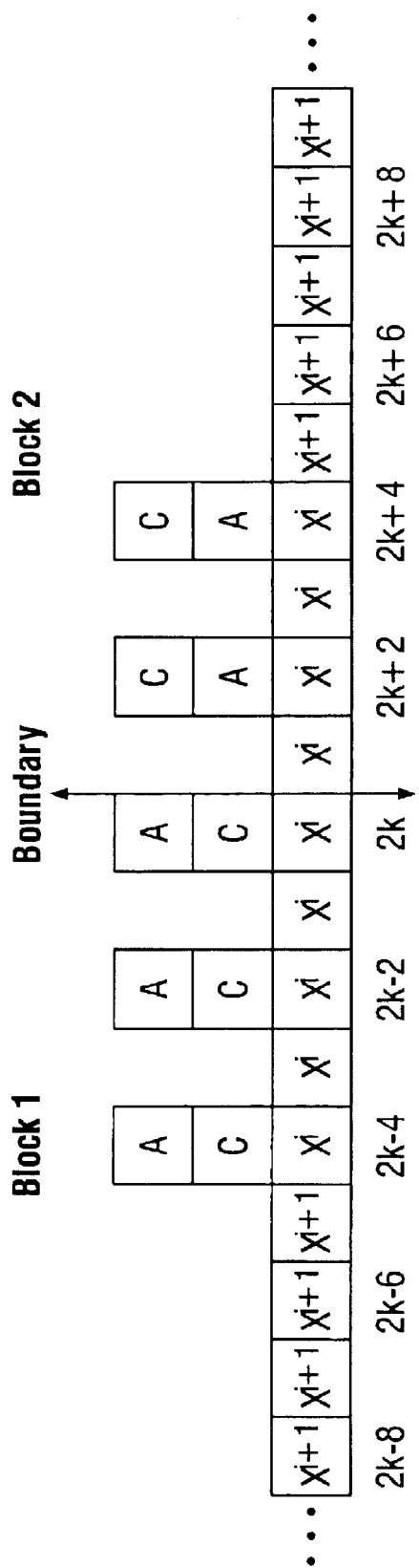
FIG. 16 illustrates one example of the overlap-state processing in parallel DWT. (a)Input in initial state i. (b) Input is partitioned over two processors. Block 1 and 2 are transformed separately and each have state information appearing near the block boundary. (c) State information is exchanged between two processors and the partially updated samples are fully updated. (d) Completely transformed (updated)input, from state i to i+1.
Figure 16D:
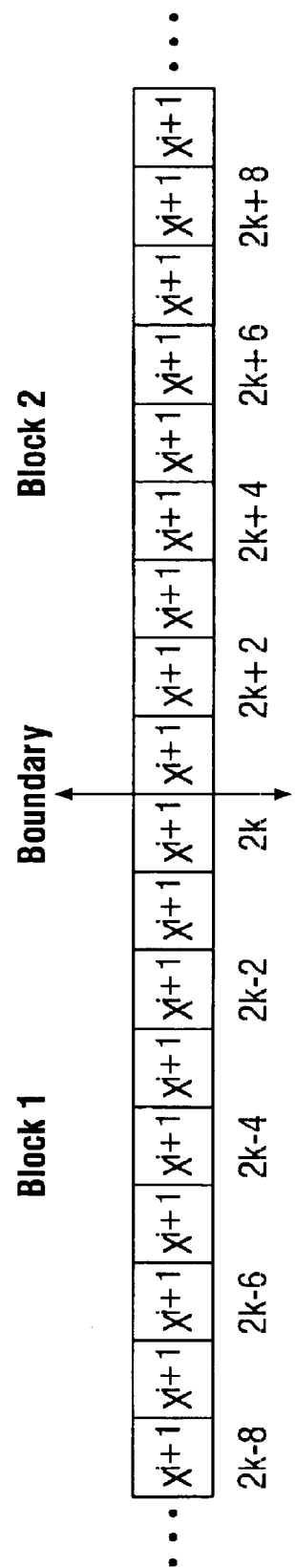

The state information in neighboring blocks has to be in exchanged to complete the transform for samples near the block boundary. According to the present overlap-state technique, this can be done by overlapping the states between consecutive blocks. Thus DWT computation can be performed across consecutive data blocks. FIG. 15 illustrates this overlap-state procedure in the sequential processing. FIG. 16 illustrates the overlap-state procedure in the parallel processing. Though only one state transition is shown in these two figures, the overlap-state design can be easily generalized to multiple state transitions at multiple decomposition levels because all these state transitions share the same three properties.

C. Performance Analysis

C.1 Buffer Size Analysis

This section evaluates the savings on the overlap buffer size produced by the overlap-state technique in comparison with other DWT processing techniques. Buffer size is an important consideration for memory constrained sequential architecture design.

As shown before, at each stage, the partially updated samples and contributing samples need to be stored. Denote the total number of partially updated samples as $B_1^i$ and the total number of contributing samples as $B_2^i$. Writing $s^i(z)$ and $t^i(z)$ as $$B^i(z) = \sum_{n=-a^i}^{b^i} s^i(n)s^{-n} \quad t^i(z) = \sum_{n=-a^i}^{b^i} s^i(n)x^{-n} \qquad (17)$$

where $a^i \geq 0$ and $b^i \geq 0$. Then $B_1^i=a^i$ and $B_2^i=b^i$. The number of samples that must be buffered at stage i, Bi, is $B^i=a^i+b^i$. Assume there are N state transitions in the factorization of P(z), the buffer size $B_s$ for one level decomposition is $$B_s = \sum_{i=0}^{N-1} B^i \qquad (17)$$

$$= \sum_{i=0}^{N-1} (a^i + b^i)$$

Since the lifting factorization of a given polyphase matrix is not unique, obviously one would choose the factorization which gives the minimum $B_s$ if the amount of memory is limited. An alternative way to find out the buffer size is to graphically plot the state transitions for a given factorization.

C.2 Communication

The communication delay is the time used for exchanging data between adjacent processors. In a number of prior parallel algorithms [11], [24], before each level of decomposition, (L−2) boundary samples need to be communicated to the adjacent processors (L is the filter length). The total communication time $D_{old}$ for a J level wavelet decomposition, can be calculated as $$D_{old} = J(t_s + (L-2)t_w + t_p). \quad (18)$$

In the present parallel algorithm based on the overlap-state technique, the data exchange can be delayed after the independent transform of each block so that only one communication is necessary, the size of the state information at each stage $B_s$ is upper bounded by (L−2). So the communication time is bounded by an upper limit:

$$D_{new} \leq t_s + J(L-2)t_w + t_p. \quad (19)$$

Hence, the communication time is reduced.

Figure 17:
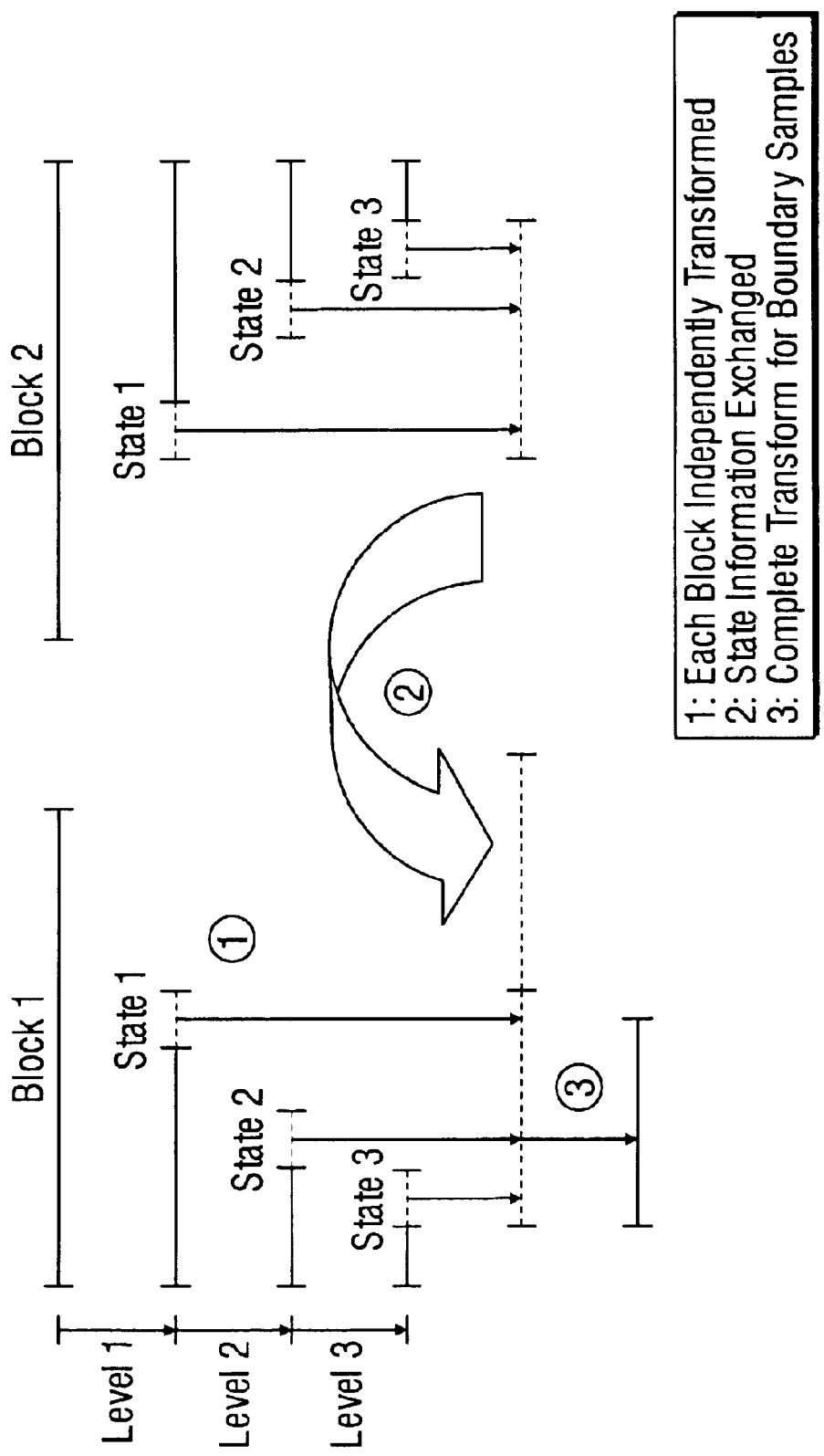
FIG. 17 illustrates the parallel DWT processing based on the overlap-state technique in a three-level wavelet decomposition. Solid lines: completely transformed data; Dashed lines: partially transformed data. Operation 1: each block transforms its own allocated data independently and state information is buffered; Operation 2: state information is communicated to neighboring blocks; Operation 3: complete transform for the boundary data samples.

FIG. 17 shows an example of three level decompositions based on the overlap-state in the parallel processing. Two consecutive blocks 1 and 2 are first processed independently without any exchange between them. The samples represented by solid lines are completely updated. The samples represented by dashed lines are partially updated and need data from the other block to complete the computation. After the computations in each block are completed, the state information of the partially updated samples in the block near the boundary is transferred. Next, the computations on the partially updated samples in the block 1 are completed based on the information from the block 2.

The overlap-state technique can reduce the communication overhead in the proposed parallel algorithm by reducing the number of communications and by reducing the amount of data exchanged between blocks. Essentially, the overlap-state technique uses a single communication setup to exchange all necessary data to complete the DWT computation rather than exchanging a small amount of data in multiple communication setups. It is, however, important to emphasize that how much this communication overhead reduction contributes to the reduction of the total computation time strongly depends on the parallel system communication link design. Clearly, the slower the inter-processor communication, the larger the gain and vice versa.

D. Delayed Normalization

Although the lifting based DWT algorithm has been shown to be twice as fast as the standard algorithm by Daubechies and Sweldens, this is only true in general asymptotically for long filters [33]. This section describes a simple technique, Delayed Normalization to reduce the computation of multilevel wavelet decompositions.

Referring to Equation (7), the last matrix factor in the polyphase factorization is a normalization factor which scales the lowband and highband coefficients, respectively. This normalization factor will appear at each level of decomposition for a multilevel wavelet decomposition. Since the wavelet transform is a linear operation and multiplication is commutative for linear operations, this normalization (multiplication) operation can actually be delayed until the last level decomposition. By doing so, computations can be saved.

Figure 18A:
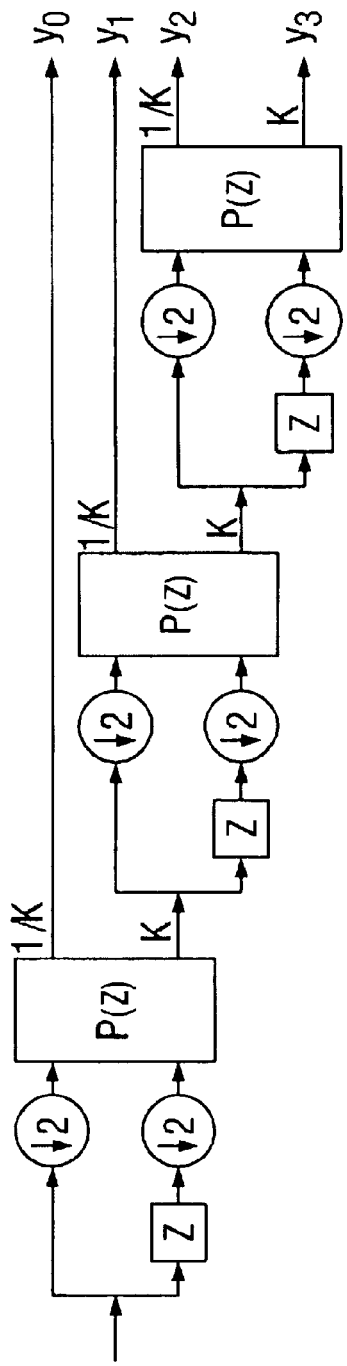
FIGS. 18A and 18B show an example of the delayed normalization in a three-level octave-band wavelet decomposition.
Figure 18B:
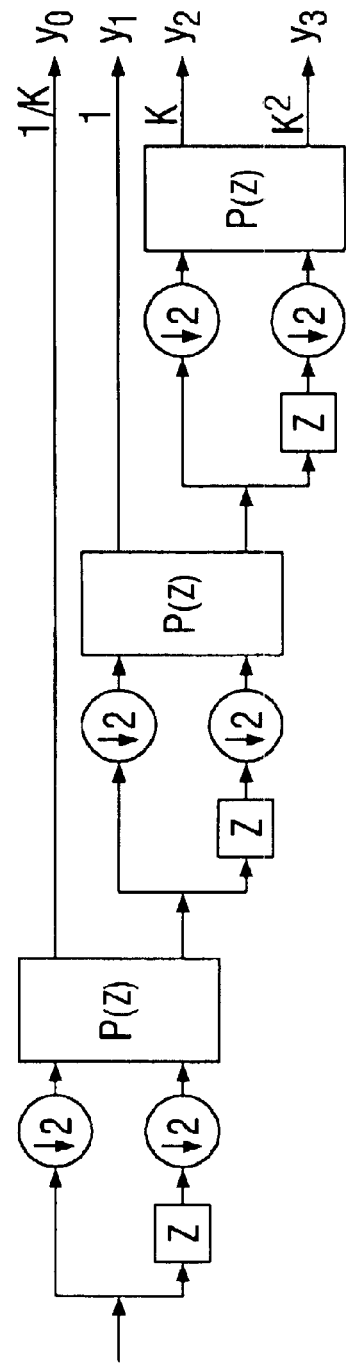

FIGS. 18A and 18B show an example of the delayed normalization in a three-level octave-band wavelet decomposition. FIG. 18A shows the recursive two-channel lifting and FIG. 18B shows the two channel lifting with delayed normalization. Interestingly, normalization operations for all the $y_1$ coefficients can be all eliminated provided that the same wavelet filterbanks are applied at each stage. If a different wavelet filterbank is used at each level of decomposition, then in general only one normalization (multiplication) operation is necessary for each wavelet transform coefficient. Obviously such a delayed normalization technique can also be used for multidimensional wavelet decompositions and wavelet packet decompositions.

Figure 19A:
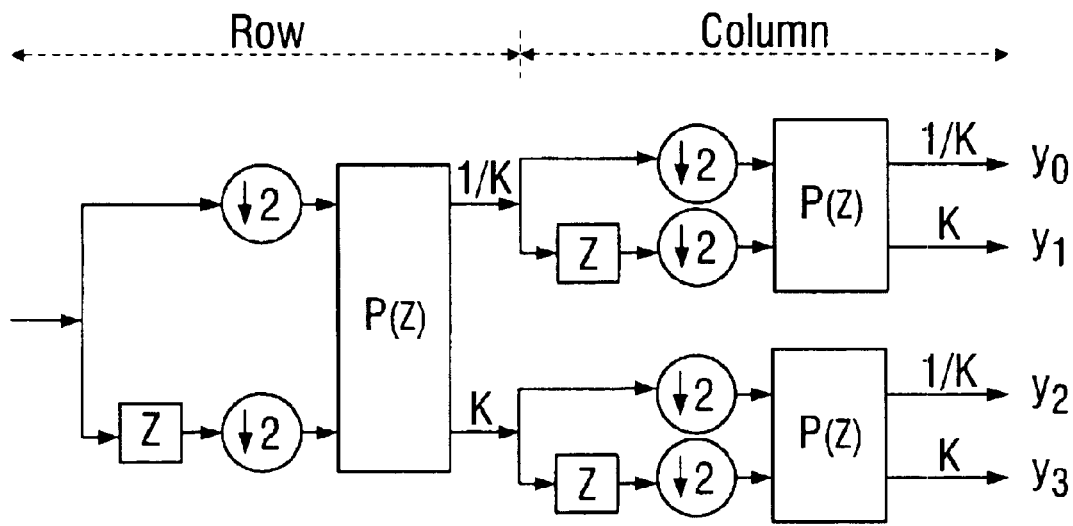
FIGS. 19A and 19B show a one-level 2D wavelet decomposition with recursive normalization and delayed normalization, respectively.
Figure 19B:
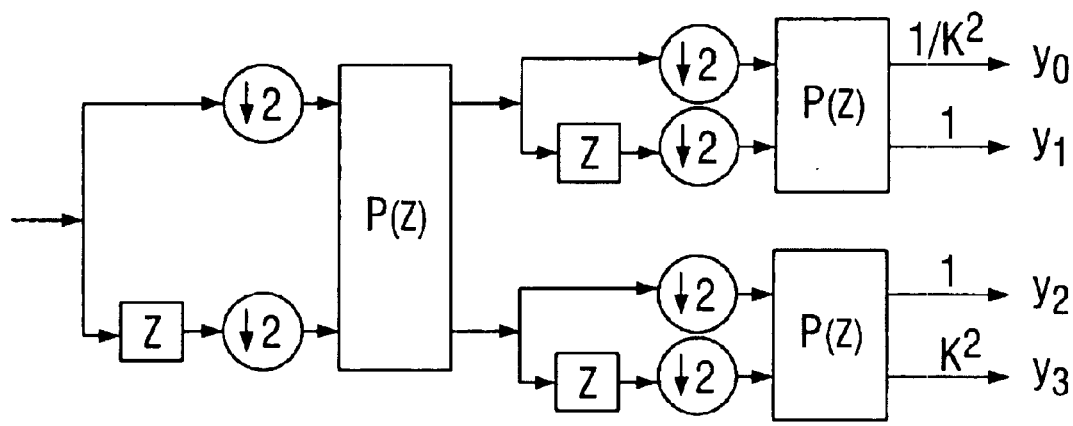

FIGS. 19A and 19B show a one-level 2D wavelet decomposition with recursive normalization and delayed normalization, respectively.

Turning to the performance analysis for 1D octave-band wavelet decomposition, let the input data sequence length be N and the decomposition level be J. The computational costs of the standard algorithm, the lifting scheme, and the lifting scheme with delayed normalization are denoted respectively as $C_M^J$, $C_L^J$, and $C_{L'}^J$. The cost unit is the average number of multiplications and additions per output point. Then $$C_M^J = C_M^1(1 + \tfrac{1}{2} + \tfrac{1}{4} + \ldots + \tfrac{1}{2^{J-1}}) = 2C_M^1(1 - 2^{-J}), \quad (20)$$

where $C_M^1$ is the number of multiplications and additions per output point for one level decomposition using the standard algorithm. Accordingly, the lifting cost is $$C_L^J = 2C_L^1(1 - 2^{-J}). \quad (21)$$

For the lifting scheme with delayed normalization, the whole wavelet transform can be decomposed into two parts. One is the normal lifting operation part which lasts for J levels without normalization. For this part the one-level average cost is $C_{L'}^1 = C_L^1 - 1$ since one normalization/multiplication is saved for each coefficient. The second part is the final normalization part for all the coefficients. This part incurs cost 1 (one multiplication) per output point. So the total average cost is $$C_{L'}^J = 2(C_L^1 - 1)(1 - 2^{-J}) + 1 = C_L^1 + 2^{-(J-1)} - 1. \quad (22)$$

If N is large enough such that J can be large enough, then in the limit $C_{L'}^1$ is on an average one operation fewer than that of a pure lifting scheme. Table II compares costs for different multilevel wavelet decompositions by using the same filters based on Daubechies and Sweldens [33].

TABLE II

COSTS COMPARISON FOR MULTILEVEL WAVELET DECOMPOSITIONS (J > 3)

| Wavelet | Standard | Lifting Cost | Lifting speedup | Lifting With Delayed Normalization cost | Lifting With Delayed Normalization speedup |
|---|---|---|---|---|---|
| Haar | 1.5 | 1.5 | 0% | 1.5 | 0% |
| D4 | 7 | 4.5 | 56% | 3.5 | 100% |
| D6 | 11 | 7 | 57% | 6 | 83% |
| (9-7) | 11.5 | 7 | 64% | 6 | 92% |
| (4, 2)B-spline | 8.5 | 5 | 70% | 4 | 113% |

The above performance analysis applies for transforms with different wavelet filters at each stage. It is assumed that J is large enough such that $2^{-(J-1)}$ is negligible. If the same filterbank is used at all decomposition stages, the assumption can be further relaxed.

Recall that the normalizations for $y_1$ coefficients can all be eliminated (see FIG. 17). The savings is 0.25 since one-quarter of the total input data samples do not have to be scaled. Thus average cost of the normalization part should be 0.75 rather than 1 per output point. Taking this into consideration, as long as J is large enough such that $2^{-(J-1)} \leq 0.25$, the above cost estimation $C_L^1$, is accurate. That is equivalent to having J>3 which is a reasonable assumption for most practical wavelet applications.

Further reduction of the normalization operation is possible if the DWT system and the immediate data processing system can be jointly designed for this purpose. For example, in a wavelet data compression system, wavelet coefficients can be quantized immediately after transform. FIG. 20A shows one embodiment of such a system. The quantizers $Q_i$(i=0,1,2,3) are designed for wavelet coefficients in different subbands.

The normalization operation can be done jointly with this quantization operation and thus can be completely eliminated from the transform operation. FIG. 20B shows a design with a joint transformation and quantization. For other applications, such as noise reduction using thresholding, this computation reduction is also possible. Compared to independent transform and quantization, computation can be saved if designed jointly.

IV. Exemplary DWT Architectures

This section describes exemplary sequential and parallel architecture designs for 1D DWT using the Overlap-State technique. Variations are then detailed for 2D separable DWT systems.

A. 1D Systems

Figure 21:
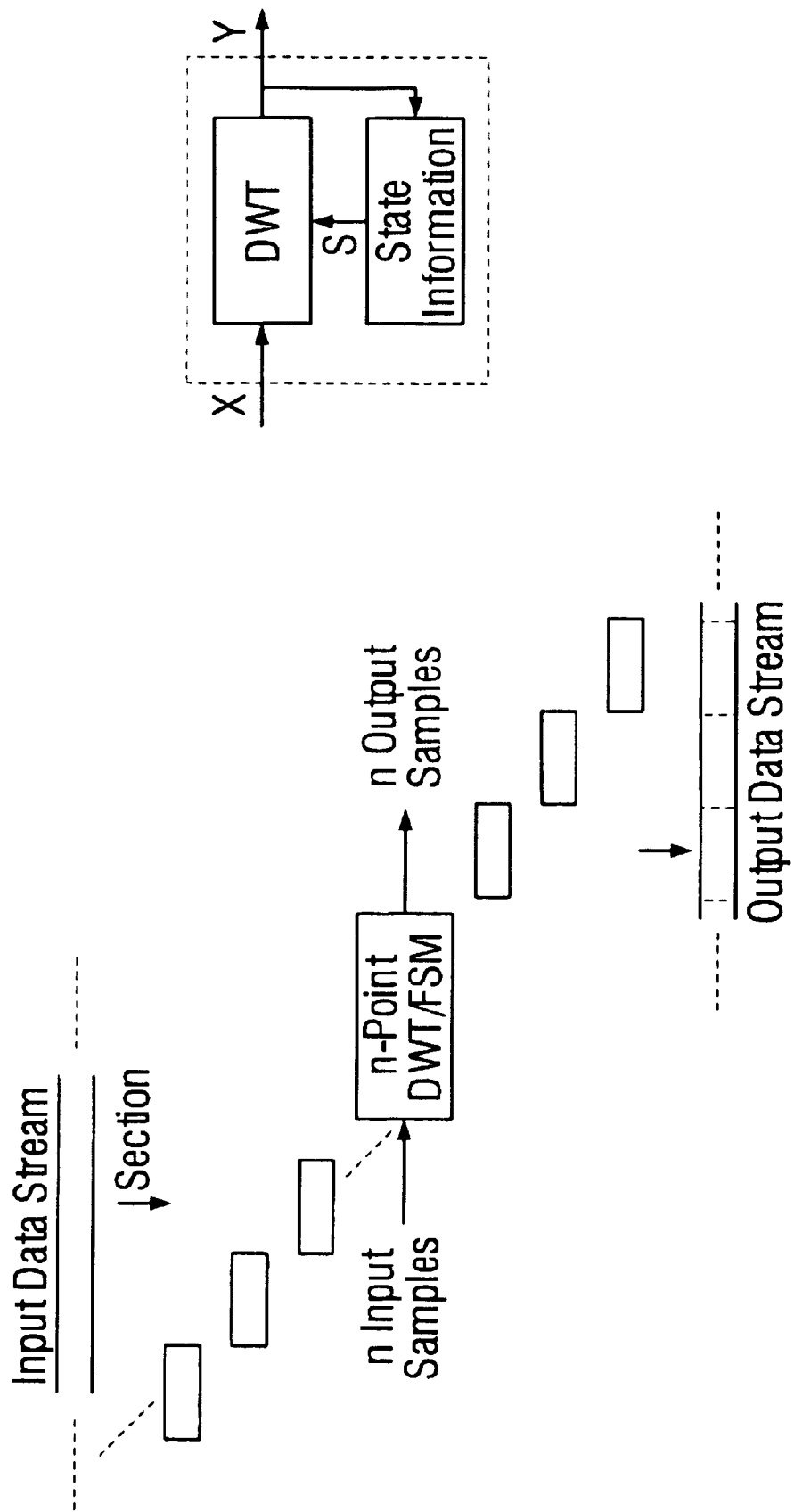
FIG. 21 shows on embodiment of a sequential DWT architecture based on the overlap-state technique.

FIG. 21 shows a sequential DWT system, with the corresponding pseudo code sequential algorithm given in Table III. The input data sequence is first segmented into non-overlapping blocks of length N and fed into the FSM one block at a time. The state information is saved so that after one block has been computed the next one can use it. After transformation, the wavelet coefficients are concatenated together to give the final result.

TABLE III

THE PROPOSED SEQUENTIAL DWT ALGORITHM.

```
begin
    initialize state S;
    (k = 0; k < N; k++)
    {
        J-level wavelet transform for block k;
        updated state S;
    }
end
```

The DWT/FSM acts as a state machine with memory and the state information (partially computed boundary samples from the previous block) at multiple decomposition level are overlapped. This helps to reduce the memory requirement for the transform computation. This overlap leads to output delay in practice, i.e., the n output samples shown in FIG. 21 are delayed relative to the n input samples.

Table IV shows the required overlap buffer sizes ($B_s$) of different sequential DWT algorithms for comparison. For an N-point input data block, if the lifting algorithm is implemented, the total buffer is $N+B_s$. The system efficiency $\eta$ is $$\eta = \frac{N}{N + B_s}.$$

Hence, the proposed sequential DWT algorithm, using the overlap-state technique, requires a smaller overlap buffer size $B_s$. This improves the system throughput. However, if N>>O (JL) then the relative improvement becomes small.

On the other hand, if N=0 when all completely transformed coefficients are immediately transferred (e.g., the line-based system in [12], [35]), the savings in memory can be significant (details are given in the next section).

TABLE IV

OVERLAP BUFFER SIZE $B_s$ IN
ID DWT FOR J-LEVEL DECOMPOSITIONS
USING A L-TAP WAVELET FILTERBANK.

| | SSWT[28] | RPA[7] | Proposed |
|---|---|---|---|
| L-tap | $(2^J - 1)(L - 2)$ | $J(L - 2)$ | $\leq J(L - 2)$ |
| (9, 7) | $7(2^J - 1)$ | 7J | 4J |
| (2, 10) | $8(2^J - 1)$ | 8J | 4J |
| CDF(4, 2) | $5(2^J - 1)$ | 5J | 3J |

Figure 22:
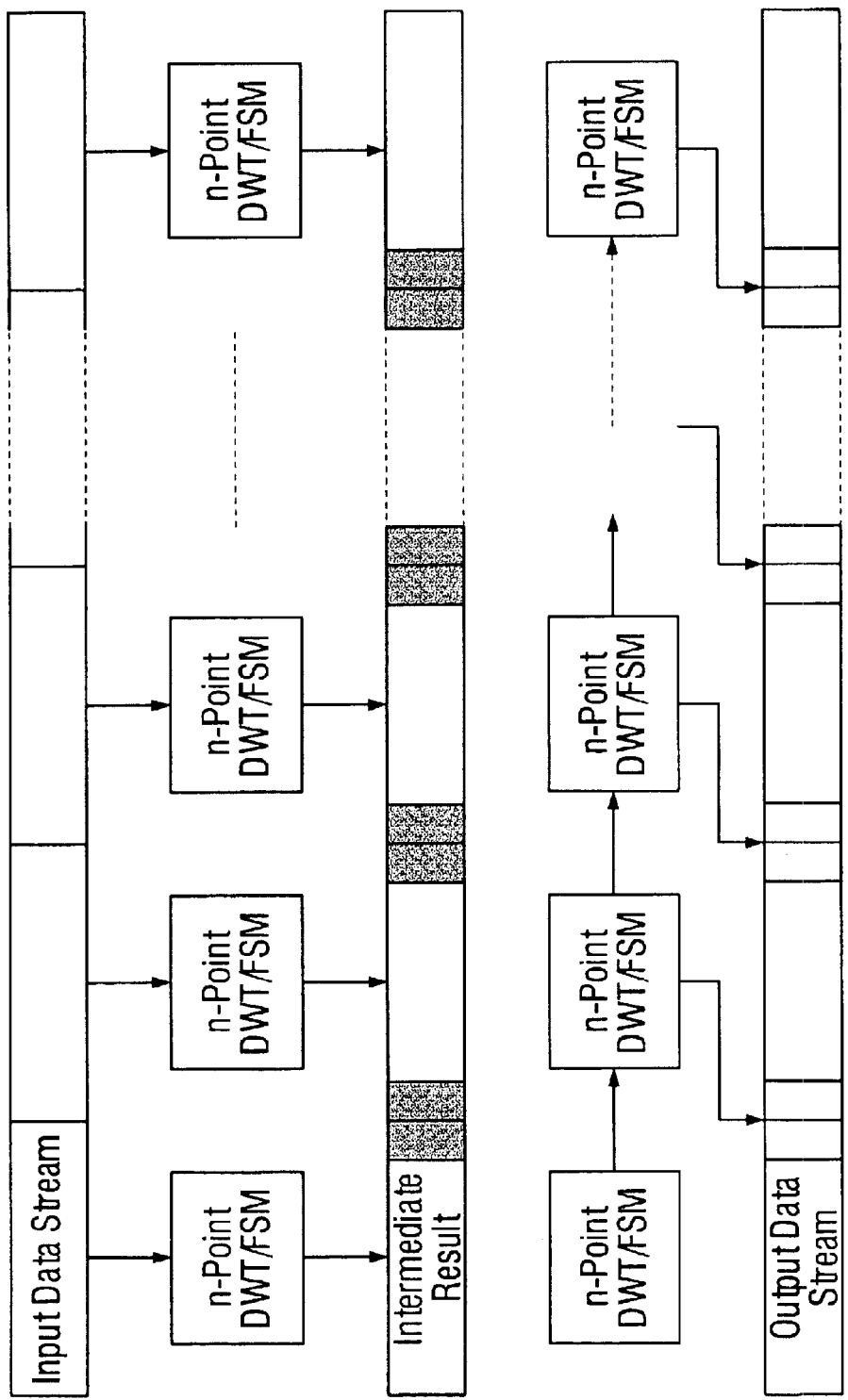
FIG. 22 shows on embodiment of a parallel DWT architecture based on the overlap-state technique. In Split stage, each processor computes its allocated data independently up to the required decomposition level. In Merge stage, a one-way communication is initiated to communicate the state information to neighboring processors. A postprocessing operation is then started to complete the transform for boundary samples.

FIG. 22 shows an example of the parallel DWT architecture based on the overlap-state technique. The corresponding pseudo code algorithm is given in Table V. The input data is uniformly segmented non-overlapping blocks and allocated onto p available processors. Each processor computes its own allocated data up to the required wavelet decomposition level. This stage is called Split. The output from this stage includes (i) completely transformed coefficients and (ii) the state information (partially updated boundary samples). In the second stage, Merge, a one-way communication is initiated and the state information is transferred to the neighboring processors. The state information from the neighbor processor is then combined together with its own corresponding state information to complete the whole DWT transform.

TABLE V

THE PROPOSED PARALLEL DWT ALGORITHM.

```
begin {transform in processor p}
    for (j = 0; j < J:j + +)
    {
        transform at current level j.
        store state information.
    }
    send state information to processor p + 1;
    receive state information from processor p - 3;
    for (j = 0; j < J; j + +)
    {
        transform boundary data samples at current level j.
    }
end
```

The proposed parallel architecture only requires one communication between neighboring processors for J-level decompositions. The amount of data exchanged is also less than that in direct overlapping approaches [11], [24]. Therefore, the communication delay is reduced.

B. 2D Systems

Figure 23:
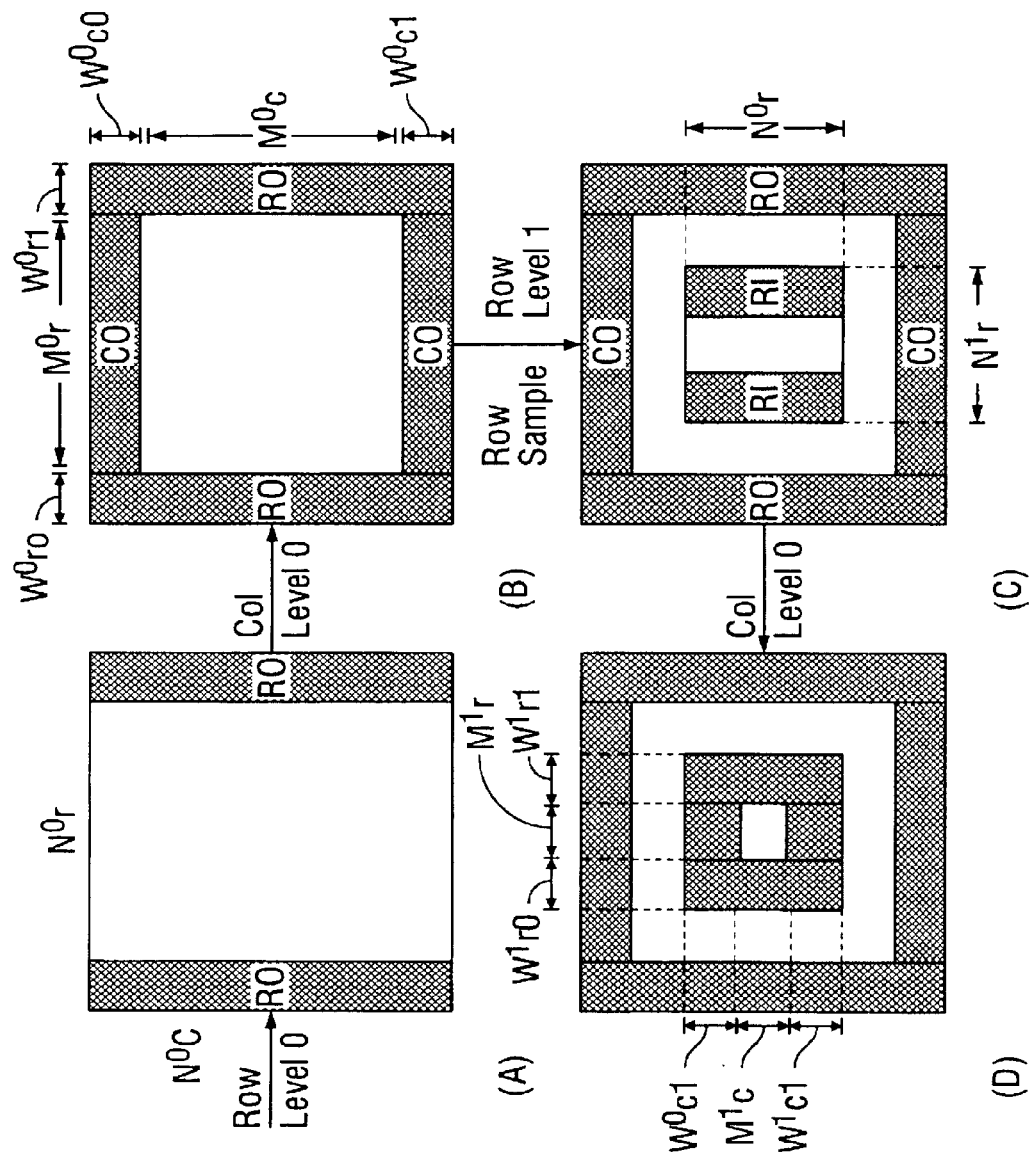
FIG. 23 shows an example 2D DWT with two level decompositions based on the overlap-state technique.

FIG. 23 shows an example 2D DWT with two level decompositions based on the overlap-state technique. The data is row transformed first and then column transformed. Data samples along block boundaries cannot be fully transformed due to the lack of neighboring samples. These constitute the row and column state information at each level. The shaded areas represent the state information with RO/CO the row/column state information at level 0 and so on. The input block is first row transformed as shown in (a) and column transformed as shown in (b) at 1a eve1 0. The input block is then downsampled (taking the LL0 subband) and row transformed at level 1 as shown in (c), and column transformed at level 1 shown in (d).

The following notations are used. The width and the height of the data block are represented by $N_r$, $N_c$, respectively. For decomposition level j=0,1, . . . ,J−1, the following are defined:

$\{W_{ro}^j, W_{r1}^j\}$: the numbers of partially transformed samples near left and right boundaries respectively in a row. $\{W_{co}^j, W_{c1}^j\}$ are defined similarly for a column.

$\{N_r^j, N_c^j\}$: the length of a row and a column respectively before the start of the decomposition at each level.

$\{M_r^j, M_c^j\}$: the numbers of completely transformed samples in a row and a column respectively.

$B_s^j$: the total number of partially updated samples, i.e., the size of the buffer to hold the state information for further processing.

The following relationships can be established between these quantities:

$$M_r^j = N_r^j - W_{rl}^j - W_{rl}^j$$

$$M_r^j = N_r^j + W_{co}^j - W_{cl}^j$$

$$N_r^j = \begin{cases} [M_r^{j-1}/2] & j \geq 1 \\ N_r & j = 0 \end{cases}$$

$$N_c^j = \begin{cases} [M_r^{j-1}/2] & j \geq 1 \\ N_r & j = 0 \end{cases}$$

$$H_c^j = N_r^j N_c^j - M_r^j M_r^j$$

Upon completion of all J-level decompositions, we have $$B_s = \sum_{j=0}^{j-1} B_A^j$$

$$H_c = B - B_s$$

$$= N_r N_e - \sum_{j=0}^{J-1} B_e^j$$

where $B_s$ is the total buffer size necessary to store the state information at all decomposition levels and $B_e$ is the effective block size, i.e., number of wavelet coefficients that can be transferred to the next stage for processing, thus freeing up memory.

C. Sequential Architectures

Sequential architectures can have a strip sequential configuration or a block sequential configuration.

Figure 24:
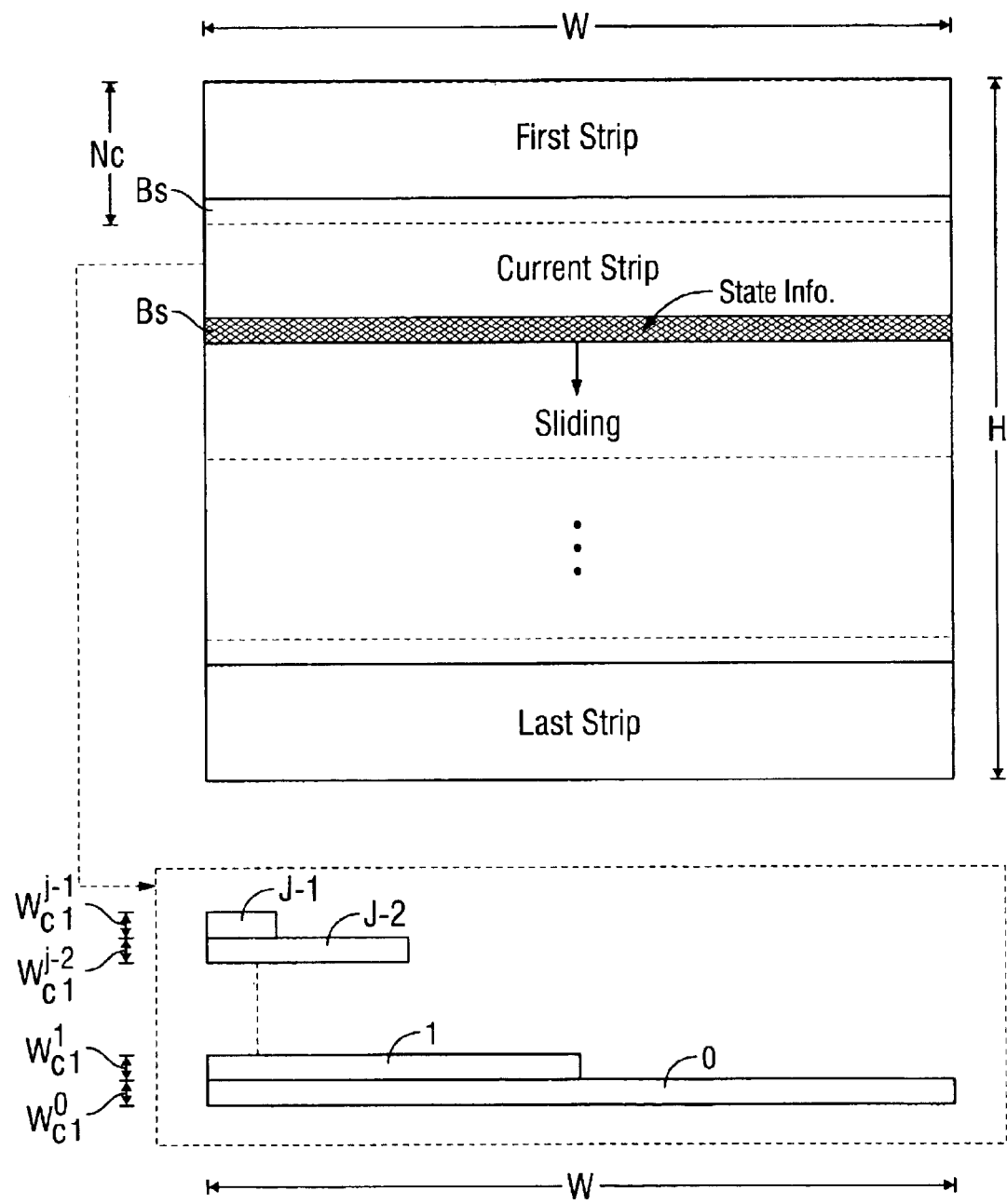
FIG. 24 shows a trip sequential DWT system diagram. The input is segmented into data strips, which are transformed sequentially from top to bottom.

FIG. 24 shows an example of the strip sequential configuration. In this case, the buffer is organized to hold one strip of data at a time. Hence, $B=WN_c$ or $B=N_rH$, where W×H is the original data size. FIG. 24 shows the former case. Because the input data is segmented only in column direction, state information (partially transformed samples) will only appear along the column direction. Certainly, some type of boundary extension technique, such as the symmetric extension, has to be used for the transform near the left and right row boundaries. For the transform of the very first strip, extension is also needed for the upper rows of each column. Each strip takes over the state information left by the previous strip to transform its own data. Upon completion, it also generates the state information for the next strip. Then the strip slides down and the DWT is calculated strip-by-strip with state information overlapped between strips.

A blown-up version of the state information is shown in the bottom part of FIG. 24. For a J-level decomposition, the state buffer size $B_s$ can be calculated as $$B_s = \sum_{j=0}^{J-1} B_s^j$$

$$= \sum_{j=0}^{J-1} WW_{cl}^j 2^{-j}$$

Thus, $B_s$ is proportional to the row length W for the case depicted in FIG. 24. To reduce the state buffer size, the segmentation should choose the dimension with large data size. That is, if W>H, then segment along row direction and segment along column direction if otherwise.

TABLE VI

COMPARISON OF MEMORY REQUIREMENTS WHERE W IS THE WIDTH OF THE IMAGE SCANLINE AND $\alpha = (2^J - 1)$, $\beta = [1 - 2^{-J}]$

|  | SSWT[28] | RPA[7] | Proposed |
|---|---|---|---|
| L-tap | W α(L − 2) | 2W β(L − 2) | ≦ 2W β(L − 2) |
| (9, 7) | 7W α | 14W β | 8W β |
| (2, 10) | 8W α | 16W β | 8W β |
| CDF (4, 2) | 5W α | 10W β | 6W β |

Table VI shows comparisons of the present algorithm with other algorithms for the minimum memory requirements. Evidently, the present system can produce significant memory savings. Consider a color image size of 4096×4096 where each color component sample is stored as a 4 bytes floating point number for DWT computation. In this case, one image scanline requires 48 KB. Using the Daubechies (9,7) wavelet filterbank (L=9), for a 3-level decomposition, the total memory would be 588 KB if using the RPA algorithm (the approach given in [12], [35]). Using the overlap-state technique, the buffer size can be reduced to 296 KB.

Figure 25:
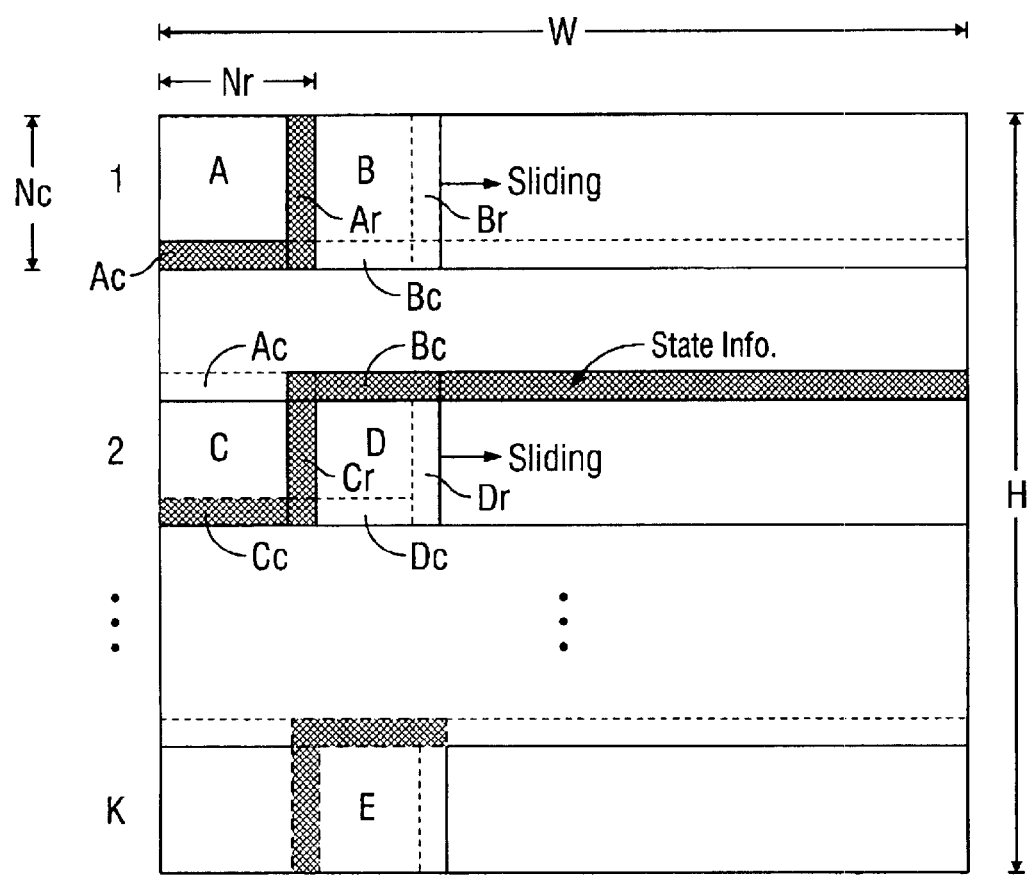
FIG. 25 shows a block sequential according to one embodiment.

FIG. 25 shows a block sequential according to one embodiment. The buffer is divided into two parts, one for holding the state information and one for new input samples in the sliding transform window. Here, $B=B_s+N_rN_c$.

The data is segmented into blocks of size $N_rN_c$, and is transformed one block at a time. Since boundary extensions can be applied for the left and up boundaries of the very first block A, state information $\{A_r, A_c\}$ will appear only on the right and down side of the block upon completion of the transform. The $\{A_r, A_c\}$ correspond respectively to the partially transformed row and column samples. When the window slides right to the position of block B only the row state information $A_r$ can be overlapped. This shows that $A_r$ can be fully transformed by overlapping while $A_c$ has to be buffered for later processing. As for block A, the column state information generated by block B also has to be buffered. This process continues until the completion of transforms of all the blocks in the first block row. By that time, the column state information has accumulated to the size $B_s$ exactly same as that of the sequential strip DWT.

The state buffer size $B_s$ does not increase beyond this point. This can be verified by checking the first block C in the second block row. For clarity of illustration, the second row is drawn separately from the first block row in FIG. 25. Actually, the two block rows are overlapped with the part of the state information. That is, block C takes over the state information $A_c$ to complete the transform. When the transform stops, state information also appears on the right and down boundaries of block C. However, since $A_c$ has now been fully transformed and hence can be transferred out, $C_c$ can be written into the locations of $A_c$ without increase of the total state buffer size $B_s$.

The most general case of sequential block DWT is depicted for block D. The block D overlaps with previously generated state information in both the row and column directions, $\{C_r, B_c\}$. When it finishes its transform, it leaves $\{D_c, D_r\}$ for later processing. The transform of block E in the last block row is the same as that of D except that boundary extension can be used in the column direction.

The system efficiency can be evaluated by determining the buffer size to completely transform a block of data of size N×N. This is typical in a transformed-based image coding application where images are coded on a block-by-block basis. Assume the buffer is of size $N_B \times N_B$.

Table VI shows the comparison, where $N_B$ is given for J-level wavelet decompositions using different wavelet filterbanks and overlapping techniques. Take the Daubechies (9,7) filterbank as an example and assume the decomposition level is J=3. If the block size is of 32×32, then N=32. Using SSWT, then $N_B$=32+49=81 which means a buffer size of 81×81 is needed to compute the DWT of a data block 32×32. The efficiency η in this case is approximately 16%. Using RPA, then $N_B$=45 and the efficiency increases to 50%. If we use the overlap-state technique, then $N_B$=39 and the efficiency increases to 64%.

TABLE VI

COMPARISON OF MEMORY REQUIREMENTS WHERE W IS THE WIDTH OF THE IMAGE SCANLINE AND $\alpha = (2^J - 1)$, $\beta = [1 - 2^{-J}]$

|  | SSWT[28] | RPA[7] | Proposed |
|---|---|---|---|
| L-tap | W α(L − 2) | 2W β(L − 2) | ≤ 2W β(L − 2) |
| (9, 7) | 7W α | 14W β | 8W β |
| (2, 10) | 8W α | 16W β | 8W β |
| CDF (4, 2) | 5W α | 10W β | 6W β |

D. Parallel Architectures

Figure 26:
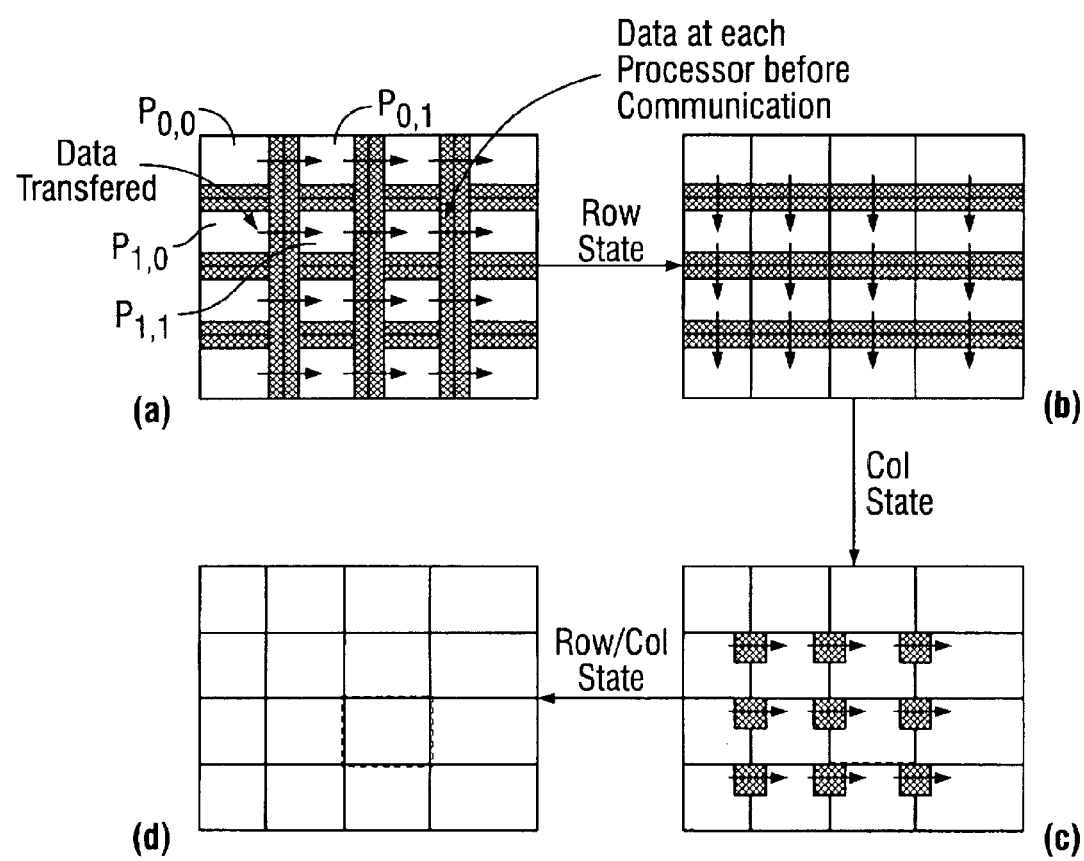
FIG. 26 shows merge operations in 2D mesh processor network. (a) transfer of row state information from $P_{i,j}$ to $P_{i,\,j+1}$; (b) transfer of column state information from $P_{i,j}$ to $P_{i+1,\,j}$; (c) transfer newly generated row state information from $P_{i,j}$ to $P_{i+1,\,j+1}$; (d)complete transform for boundary samples. Notice the total amount of data in each processor in the final state (d) is different from the original uniform allocation due to the Merge operations.

As shown before, in the first phase Split each processor is allocated with its portion of data and starts the transform all the way to the required decomposition level J. Upon completion, the data configuration at each processor is shown in FIG. 26(a). The center part of each block is completely transformed while the boundaries are left with the partially transformed samples, i.e., the state information. The next stage Merge is to communicate the state information and complete the transform for boundary samples. If the single-port model is used, then three communications are necessary to complete the transform, one for row state, one for column and one for the intersection of row and column state. However, if the multi-port model is used, the row and column state information exchanges can be implemented simultaneously thus reducing one communication. This Merge process is shown in FIG. 26 from (a) to (d) for the single-port model. If the multi-port model is used, (a) and (b) can be combined to simultaneously transmit/receive the row and column state information to/from neighboring processors. This is in contrast to the observation given in [15] that "The 2D DWT algorithms seem not able to effectively utilize more than a single communication port at a time", our analysis shows that using multi-port model, the communication overhead can actually be reduced compared to that of a single-port model.

In the strip parallel configuration, each processor is allocated with its own strip and transforms up to the required level of decomposition J in the first stage Split. Since no segmentation is done in the row direction, state information obviously will only appear along up and down boundaries in each block. This is shown in FIG. 27. Next, in the Merge stage, only one communication is necessary to transfer/receive the column state information from neighboring processors.

V. Experimental Results

In this section, experimental results are provided to show the computation reduction using the Delayed Normalization technique in sequential lifting algorithms. Results are also given for the parallel DWT system using the Overlap-State technique. The wavelet filterbank used is the one using Daubechies (9,7) filters. The input image is of size 512×512.

A. Delayed Normalization

In this experiment, three DWT algorithms using the (9,7) filters are implemented.

1. The recursive standard algorithm (see Table I). The computation cost is 11.5 mults/adds per output point.
2. Lifting DWT algorithm. The computation cost is 7 mults/adds per output point.
3. Lifting DWT algorithm, which delays the normalization until the last level of decomposition. The computation cost is approximately 6 mults/adds per output point.

TABLE VIII

DWT CPU TIME OF DIFFERENT SEQUENTIAL ALGORITHMS (IN SECONDS).

| | | Lifting | | Lifting with Delayed Normalization | |
|---|---|---|---|---|---|
| Level | Standard | time | speedup | time | speedup |
| 1 | 0.2398 | 0.2088 | 15% | 0.1980 | 21% |
| 2 | 0.2887 | 0.2466 | 17% | 0.2204 | 26% |
| 3 | 0.2988 | 0.2527 | 18% | 0.2303 | 30% |
| 4 | 0.3035 | 0.2598 | 17% | 0.2368 | 28% |
| 5 | 0.3098 | 0.2605 | 19% | 0.2375 | 30% |

In the experiment, 2D separable wavelet transforms are implemented. The algorithms are tested on a ULTRA-1 SUN workstation with clock speed 133 MHz. The algorithm running CPU time is measured using the clock( ) function call in C. The average CPU time over 50 running instances of each algorithm are listed in Table VIII. To compare the performances, the standard algorithm is used as the basis and the relative speedup is calculated as $T_{standard}/T_{new} - 1$.

Two observations can be seen from the experiment results. One is that the lifting scheme coupled with delayed scaling can have about 30% improvement over the standard algorithm for over three-level decompositions while lifting alone only gives about 20% improvement. Second, neither lifting algorithms achieve the performance gain as predicted. The second observation actually suggests that the number of multiplications/additions in an algorithm is not the only factor contributing to the total DWT running time. The algorithm speed may also be affected by how efficiently the pseudo code is written and the memory usage too. Obviously, this is a very important, factor to consider when building a real DWT system beyond that of reduction of numbers of multiplications and additions.

B. Strip Parallel

In this experiment, three different parallel DWT algorithms are implemented and tested against a sequential DWT algorithm.

1. Sequential lifting algorithm.
2. Each processor computes the DWT using the standard algorithm. Data exchanges between processors follow the direct overlapping technique, i.e., processors exchange data at each level of decompositions [11], [24].
3. Each processor computes the DWT using the fast lifting algorithm. Data exchanges between processors follow the direct overlapping technique, i.e., processors exchange data at each level of decompositions [11], [24].
4. Each processor computes the DWT using the fast lifting algorithm. Data exchanges between processors follow the proposed overlap-state technique.

The first issue in parallel system designs is how to allocate data to different processors. In this experiment, the strip partition strategy [11] is adopted for its simplicity and its appropriateness for the parallel system used in the experiment. The 512×512 image is segmented into two strips with size 256×512, each of which is loaded into one machine for transform. The parallel platform is LAM 6.1 from Ohio Supercomputer Center, which runs over Ethernet connected SUN ULTPA-1 workstations. Two workstations are used to simulate a parallel system with two processors. The algorithm running time is measured using the MPI_Wtime( )function call from MPI libraries. The C-code algorithm is shown in Table IX. The relative speedup is calculated against the sequential lifting algorithm as $T_{seq}/T_{para}-1$. The algorithms are tested in 50 running instances and the average DWT running times for different decomposition levels are given in Table X.

TABLE IX

THE PROPOSED PARALLEL DWT ALGORITHM.

```
MPLBarrier( MPLCOMM.WORLD);
start = MPLWtime( );
begin{transform in processor p}
    for(j = 0; j < J; j + +)
    {
        transform at current level j.
        store state information.
    }
    send state information to processor p + 1;
    receive state information from processor p − 1;
    for(j = 0; j < J; j + +)
    {
        transform boundary data samples at current level j.
    }
end
MPLBarrier(MPLCOMM.WORLD);
finish = MPLWtime( );
cpu time = finish − start:
```

It can be seen from the results that our proposed parallel algorithm can significantly reduce the DWT computation time even compared with the fastest available, parallel algorithm, parallel lifting algorithm. Notice that the improvement is not linear with the increase of the decomposition level. The reason is that, though the communication overhead increases with the decomposition level, the total numerical computation also increases. Another interesting observation is that, even at one level decomposition the proposed algorithm still outperforms the parallel lifting algorithm. This is because though the two algorithms both require one data exchange between processors, the amount of data exchanged is different. For the (9,7) filters, the proposed algorithm only needs to exchange approximately half the amount necessary in the parallel lifting algorithm.

VI. Some DWT/FSM Examples

Daubechies (9,7) Filters

This filterbank has been used extensively in the image compression algorithms proposed in the literature. The factorization of the analysis polyphase matrix (adapted from [33]) is $$P_a(s) = \begin{bmatrix} \zeta & 0 \\ 0 & 1/\zeta \end{bmatrix} \begin{bmatrix} 1 & \delta(1-z^{-1}) \\ 0 & 1 \end{bmatrix} \begin{bmatrix} 1 & 0 \\ \gamma(1+z) & 1 \end{bmatrix} \begin{bmatrix} 1 & \beta(1+z^{-1}) \\ 0 & 1 \end{bmatrix} \begin{bmatrix} 1 & 0 \\ \alpha(1+z) & 1 \end{bmatrix}$$

where $\alpha = -1.58613434$, $\beta = -0.0529801185$, $\gamma = 0.882911076$, $\delta = 0.443500852$, and $\zeta = 1.149604398$.

Based on this factorization, the forward transform is $$x_0^0(n) = x(2x)$$
$$x_1^0(n) = x(2x+1)$$
$$x_1^1(n) = x_1^0(n) + \alpha(x_0^0(n) + x_0^0(n+1))$$
$$x_0^1(n) = x_0^0(n) + \beta(x_1^1(n) + x_1^1(n-1))$$
$$x_1^2(n) = x_1^1(n) + \gamma(x_0^1(n) + x_0^1(n-1))$$
$$x_0^2(n) = x_0^1(n) + \delta(x_1^2(n) - x_1^2(n-1))$$
$$x_0^3(n) = \zeta x_0^2(n)$$
$$x_1^3(n) = x_1^2(n)/\zeta$$

The (9,7) wavelet filters can be used to transform a raw input sample into a wavelet coefficient by a total of 4 state transitions. This process is shown in FIG. 28. Assume there are 9 samples, $\{x^0(0), x^0(1), x^0(2), \ldots, x^0(8)\}$, loaded in the memory initially. The first elementary matrix $e^0(z)$ is lower triangular, so the state transition is to update odd samples with two neighboring even samples. For example, $x^0(1)$ is updated into $x^1(1)=x^0(1)+\alpha(x^0(0)+x^0(2))$. The same updat-

TABLE X

DWT RUNNING TIME OF DIFFERENT PARALLEL ALGORITHMS (IN SECONDS).

| Level | Sequential | Parallel Standard | | Parallel Lifting | | Parallel Proposed | |
|---|---|---|---|---|---|---|---|
| | | time | speedup | time | speedup | time | speedup |
| 1 | 0.3638 | 0.3115 | 17% | 0.2745 | 33% | 0.2045 | 78% |
| 2 | 0.3649 | 0.3275 | 11% | 0.2899 | 26% | 0.2338 | 56% |
| 3 | 0.3952 | 0.3490 | 13% | 0.2938 | 34% | 0.2369 | 67% |
| 4 | 0.4028 | 0.3513 | 15% | 0.3041 | 34% | 0.2383 | 69% |
| 5 | 0.4041 | 0.3675 | 9% | 0.3165 | 28% | 0.2417 | 67% | ing also occurs for samples $\{x^0(3), x^0(5), x^0(7)\}$. Notice that samples $\{x^0(0), x^0(8)\}$ remain un-updated because they are needed by neighboring blocks, e.g., $x^0(8)$ is needed by $x^0(9)$ and $x^0(0)$ is needed by $x^0(-1)$. Consequently, $x^0(0)$ and $x^0(8)$ are preserved as the state information at state 0. βγ

The next elementary matrix $e^1(z)$ is upper triangular so it updates even samples using odd samples. For example, $x^1(2)$ is updated into $x^2(2)=x^1(2)+\beta(x^1(1)+x^1(3))$ and so are samples $\{x^1(4), x^1(6)\}$. Again, $x^1(1)$ and $x^1(7)$ are preserved as the state information at state 1. The same process continues until $x^0(4)$ is updated into the final transform coefficient $x^4(4)$.

The state information near the right boundary consists of samples shown in shaded boxes in the figure, i.e., $\{x^3(5), x^2(6), x^1(7), x^0(8)\}$. So the overlap buffer size for one level of wavelet decomposition using the Daubechies (9,7) filters is 4 samples. These partially updated samples constitute the only information one needs to buffer for the transform of the new input data pair $\{x^0(9), x^0(10)\}$. The operations are shown as dashed lines in the figure. All these operations are based on the state information, which is preserved in the memory buffer.

(2,10) filters

This filter has been found to give excellent performance for lossless image compression. The factorization of the analysis polyphase matrix is $$P_n(x) = \begin{bmatrix} 1 & 0 \\ \frac{3}{64}(z^2 - z^{-2}) + \frac{22}{64}(z - z^{-1}) & 1 \end{bmatrix} \begin{bmatrix} 1 & 1/2 \\ 0 & 1 \end{bmatrix} \begin{bmatrix} 1 & 0 \\ -1 & 1 \end{bmatrix}$$

Based on this factorization, the forward transform is $$x_0^1(n) = x(2n)$$

$$x_1^1(n) = x(2n+1) - x(2n)$$

$$x_0^2(n) = x_0^1(n) + x_1^1(n)/2$$

$$x_1^2(n) = x_1^1(n)$$

$$x_0^3(n) = x_0^2(n)$$

$$x_1^3(n) = x_1^2(n) + \frac{3}{64}(x_0^2(n-2) + x_0^2(n+2)) + \frac{22}{64}(x_0^2(n-1) - x_0^2(n+1))$$

The respective inverse transform is:

$$x_1^2(n) = x_1^3(n) - \frac{3}{64}(x_0^2(n-2) - x_0^2(n+2)) + \frac{22}{64}(x_0^2(n-1) - x_0^2(n+1))$$

$$x_0^2(n) = x_0^3(n)$$

$$x_1^1(n) = x_1^2(n)$$

$$x_0^1(n) = x_0^2(n) - x_1^1(n)/2$$

$$x(2n) = x_0^1(n)$$

$$x(2n+1) = x_1^1(n) + x(2n)$$

The first two state transitions are basically the same as those of the (9,7) filters.

Figure 29:
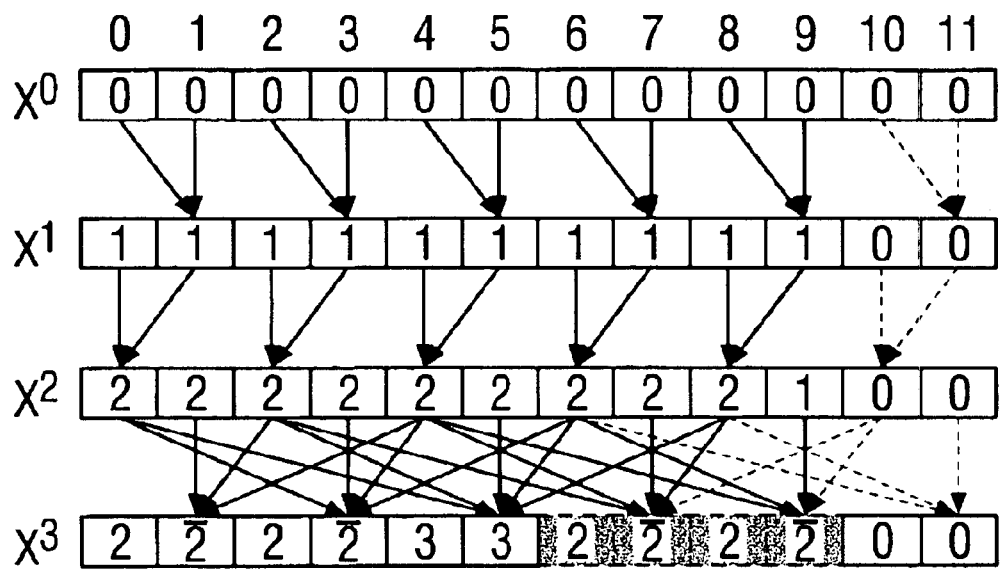
FIG. 29 illustrates state transitions of the (2,10) filters using factorization, where state information includes 4 samples in shaded boxes. Dashed lines represent operations necessary for the transform of the new input sample pair $\{x^0(10),x^0(11)\}$.

FIG. 29 show the state transitions for 10 initial samples in the memory. The last transition is detailed here. The elementary matrix $e^2(z)$ is $$e^2(z) = \begin{bmatrix} 1 & 0 \\ \frac{3}{64}(z^2 - z^{-2}) + \frac{22}{64}(z - z^{-1}) & 1 \end{bmatrix}$$

This is a lower triangular matrix so odd samples get updated. For example, $x^2(5)$ is updated into $$x^3(5) = x^2(5) + \frac{3}{64}(x^2(8) - x^2(0)) + \frac{22}{64}(x^2(6) - x^2(2))$$

On the other hand, $x^2(7)$ can not be fully updated because $x^0(10)$ is not available (not in buffer yet). However, it can be partially updated as $$x^3(7) = x^2(7) + \frac{3}{64}(-x^2(2)) + \frac{22}{64}(x^2(8) - x^2(4))$$

This partial updating then frees sample $x^2(2)$ from the buffer. In other words, to fully update $\overline{x^2}(7)$, no samples with indices smaller than 7 are needed. Same partially updating is also performed for sample $x^2(9)$ as $$x^2(9) = x^2(9) + \frac{3}{64}(-x^2(6)) + \frac{22}{64}(-x^2(4))$$

The only samples which have to be buffered are $\{x^7(6), \overline{x^2}(7), x^2(8), \overline{x^2}(9)\}$. So the overlap buffer size is 4 samples.

When the next new input pair $\{x^0(10)\ x^0(11)\}$ comes, operations in dashed lines are executed. As a result, samples $\{x^2(6), \overline{x^2}(7)\}$ are completely transformed thus can be removed from the buffer. However, samples $\{x^0(10)\ x^0(11)\}$ can only be partially updated and thus have to be buffered. This process continues until all inputs are transformed.

CDF (4,2) filters

The scaling function of CDF(4,2) filters is a cubic B-spine which is used frequently in computer graphics for interpolation. The factorization of the analysis polyphase matrix (adapted from [33])is $$P_n(z) = \begin{bmatrix} 1/2 & 0 \\ 0 & 2 \end{bmatrix} \begin{bmatrix} 1 & \frac{3}{10}(1+z^{-1}) \\ 0 & 1 \end{bmatrix} \begin{bmatrix} 1 & 0 \\ -(1+z) & 1 \end{bmatrix} \begin{bmatrix} 1 & -\frac{1}{4}(1+z^{-1}) \\ 0 & 1 \end{bmatrix}$$

Based on this factorization, the forward transform is $$x_0^0(n) = x(2n)$$

$$x_1^0(n) = x(2n+1)$$

$$x_0^1(n) = x_0^0(n) - \frac{1}{4}(x_1^0(n) - x_1^0(n-1))$$

$$x_1^1(n) = x_1^0(n) - (x_0^1(n) + x_0^1(n+1))$$

$$x_0^2(n) = x_0^1(n) - \frac{3}{16}(x_1^1(n) + x_1^1(n-1))$$

and the inverse transform is $$x_0^1(n) = x_0^2(n) - \frac{3}{16}(x_1^1(n) + x_1^1(n-1))$$

$$x_1^0(n) = x_1^1(n) + (x_0^1(n) + z_0^1(n+1))$$

$$x_0^2(n) = x_0^1(n) + \frac{1}{4}(x_1^0(n) + x_1^0(n-1))$$

Figure 30:
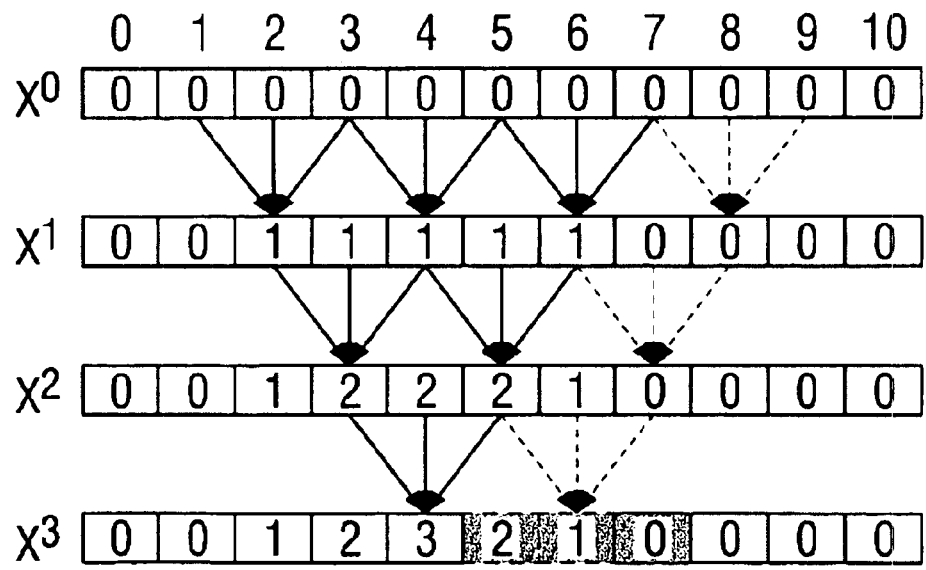
FIG. 30 illustrates state transitions of the CDF (4,2) filters using factorization, where the state information includes 3 samples in shaded boxes. Dashed lines represent operations necessary for the transform of the new input sample pair $\{x^0(8),x^0(9)\}$.

In this case, the state transition is basically the same as that of the (9,7) filters. The overlap buffer size is 3 samples as shown in FIG. 30.

The above implementations of the overlap-state technique in parallel or sequential DWT processing can be used to efficiently perform multilevel wavelet decompositions. The DWT processing is modeled as a finite state machine using the factorization of the polyphase matrix. In this model, each raw input data sample (initial state) is progressively updated into a wavelet coefficient (final state)with the help of samples in its neighborhood. The benefit of such a DWT/FSM model is that the transform (or state transition) of each sample can be stopped at any intermediate stage as long as the state information at the break point is preserved. Since the state information rather than the raw data samples needs to be stored or communicated, this technique can reduce the buffer size in a sequential architecture and the communication overhead in a parallel architecture. Detailed analysis on buffer size calculation for a given factorization and communication overhead reduction are also provided. To further reduce the computations, a delayed normalization technique for multilevel wavelet decompositions is also presented.

Using the overlap-state technique, several sequential and parallel DWT architectures are designed. A number of system variations for 2D separable DWT are provided and analyzed in detail, which include DWT systems of strip sequential, block sequential, random sequential, block parallel and strip parallel. The performance analyses and the experimental results have shown that the proposed sequential architecture requires less memory and runs faster than existing sequential algorithms. The proposed parallel architecture reduces the inter-processor communication overhead by reducing the number of communication times and the amount of data exchanged. As a result, the DWT running time of the proposed parallel architecture is faster than the best parallel algorithm available, the parallel lifting algorithm.

A number of embodiments of the invention have been described. Nevertheless, it will be understood that various modifications and enhancements may be made without departing from the following claims.

REFERENCES

[1] W. Jiang and A. Ortega, "Efficient DWT system architecture design using filterbank factorizations," in Proc. of ICIP, October 1999, vol. 2, pp. 749–753.

[2] A. Ortega, W. Jiang, P. Fernandez, and C. Chrysafis, "Implementations of the discrete wavelet transform: complexity, memory, and parallelization issues," in Proc. of SPIE: wavelet Applications in Signal and Image Processing VII, October 1999, vol. 3813, pp. 386–400.

[3] W. Jiang and A. Ortega, "A parallel architecture for DWT based on lifting factorization," in Proc. of SPIE in Parallel and Distributed Methods for Image Processing III, October 1999, vol. 3817, pp. 2–13.

[4] W. Jiang and A. Ortega, "Lifting-based discrete wavelet transform system architecture design," *IEEE Trans. on Circuits and Systems for Video Technology*, March 2000, Accepted for publication.

[5] M. Misra and V. K. Prasanna, "Parallel computation of 2-D wavelet transforms," in Proc. of 11th Intl. Conf. on Pattern Recognition, 1992.

[6] O. Rioul and P. Duhamel, "Fast algorithms for discrete and continuous wavelet transforms," IEEE Trans. on Information Theory, vol. 38, no. 2, pp. 569–586, March 1992.

[7] M. Vishwanath, "The recursive pyramid algorithm for the discrete wavelet transform," IEEE Trans. on Signal Proc., vol. 42, no. 3, pp. 673–676, March 1994.

[8] C. Chakrabarti and M. Vishwanath, "Efficient realizations of the discrete and continuous wavelet transforms: From single chip implementations to mappings on SIMD array computers," IEEE Trans. on Signal Proc., vol. 43, no. 3, pp. 759–771, March 1995.

[9] R. E. Van Dyck, T. G. Marshall, M. Chin, and N. Moayeri, "Wavelet video coding with ladder structures and entropy-constrained quantization," IEEE Trans. on Circuits and Systems for Video Technology, vol. 6, no. 5, pp. 483–494, October 1996.

[10] H. Sava, A. C. Downtown, and A. F. Clark, "Parallel pipeline implementation of wavelet transform," Proc. Inst. Elect. Eng., Vision Image Process., vol. 144, no. 6, pp. 355–359, December 1997.

[11] J. Fridman and E. S. Manolakos, "On the scalability of 2-D discrete wavelet transform alogrithms," Multidimensional Systems and Signal Processing, , no. 8, pp. 185–217, 1997.

[12] C. Chrysafis and A. Ortega, "Line based, reduced memory, wavelet image compression," in Proc. of Data Compress. Conf., 1998, pp. 398–407.

[13] M. A. Trenas, J. Lopez, and E. L. Zapata, "A memory system supporting the efficient SIMD computation of the two dimensional DWT," in Proc. of ICASSP, 1998, pp. 1521–1524.

[14] C. Chakrabarti and C. Mumford, "Efficient realizations of encoders and decoders based on the 2-d discrete wavelet transform," IEEE Transactions on VLSI Systems, 1998.

[15] J. Fridman and E. S. Manolakos, "Discrete wavelet transform: Data dependence analysis and synthesis of distributed memory and control array architectures," IEEE Trans. on Signal Processing, vol. 45, no. 5, pp. 1291–1308, May 1997.

[16] F. Marina, V. Piuru, and E. Swartzlander Jr., "A parallel implementation of the 2D discrete wavelet transform without interprocessor communication," IEEE Trans. Signal Proc., vol. 47, no. 11, pp. 3179–3184, November 1999.

[17] Proc. of the IEEE: Special Issue on Wavelets, Number 4. 1996.

[18] K. K. Parhi and T. Nishitani, "VLSI architectures for discrete wavelet transforms," IEEE Trans. on VLSI System, vol. 1, no. 2, pp. 191–202, June 1993.

[19] A. S. Lewis and G. Knowles, "VLSI architecture for 2D daubechies wavelet transform without multipliers," Electronic Letters, vol. 27, no. 2, pp. 171–173, January 1991.

[20] T. C. Denk and K. K. Parhi, 'VLSI architectures for lattice structure based orthonormal wavelet transforms," IEEE Trans. on CAS, vol. 44, no. 2, pp. 129–132, February 1997.

[21] L. Yang and M. Misra, "Coarse-grained parallel algorithms for multi-dimensional wavelet transforms," The Journal of Supercomputing, vol. 12, no. 1/2, pp. 99–118, 1998.

[22] P. Cosman, T. Frajka, and K. Zeger, "Image compression for memory constrained printers," in Proc. of ICIP, October 1998.

[23] J. Bowers, L. Keith, N. Aranki, and R. Tawel, "IMAS integrated controller electronics," Tech. Rep., Jet Propulsion Laboratory, Pasadena, Calif., USA, January 1998.

[24] O. M. Nielsen and M. Hegland, "TRCS9721: A scalable parallel 2D wavelet transform algorithm," Tech. Rep., The Australian National University, December 1997.

[25] L. Yang and M. Misra, "Parallel wavelet transforms for image processing," in ASAE Workshop on Application of Parallel Processing for Image Processing, August 1997.

[26] T. E. Anderson, D. E. Culler, D. A. Patterson, and the NOW team, "A case for NOW (Networks of Workstations)," IEEE Micro, vol. 151, pp. 54–64, February 1995.

[27] LAM Team UND, "LAM/MPI parallel computing," Last modified Mar. 24, 2000.

[28] F. Kossentini, "Spatially segmented wavelet transform," Tech. Rep., UBC, 1998, ISOIEC JTC lSC29WGl WGlN868.

[29] S. Mallat,, "A theory for multiresolution signal decomposition: The wavelet representation," IEEE Trans. on Patt. Anal. and Mach. Intell., vol. 11, no. 7, pp. 674–693, 1989.

[30] P. P. Vaidyanathan and P.-Q. Hoang, "Lattice structures for optimal design and robust implementation of two-channel perfect-reconstruction QMF banks," IEEE Trans. Acoust., Speech, Signal Processing, vol. 36, no. 1, pp. 81–94, January 1988.

[31] P. P. Vaidyanathan, "M&irate digital filters, filter banks, polyphase networks, and applications: A tutorial," Proceedings of The IEEE, vol. 78, no. 1, pp. 56–93, January 1990.

[32] T. G. Marshall, "Zero-phase filter bank and wavelet coder matrices: Properties, triangular decompositions, and a fast algorithm," Multidimensional Systems and Signal Processing, vol. 8, pp. 71–88, 1997.

[33] I. Daubechies and W. Sweldens, "Factoring wavelet transforms into lifting, steps," J. Fourier Anal. Appl., vol. 4, no. 3, pp. 247–269, 1998.

[34] R. Blahut, Fast Algorithms for Digital Signal Processing, Addison-Wesley Publishing Company, 1985.

[35] C. Chrysalis and A. Ortega, "Line based, reduced memory, wavelet image compression," IEEE Trans. on Image Processing, vol. 9, no. 3, pp. 378–389, May 2000.

[36] "Report on core experiment codeffl "Complexity reduction of SSWT"," Tech. Rep., Motorola Australia, UBC, 1998, ISOIEC JTC 1SC29WGl WGlN881.

[37] C. chrysalis, "Low memory line-based wavelet transform using lifting scheme," Tech. Rep., HP Labs, 1998, ISOIEC JTC lSC29WGl WGlN978.

[38] P. Onno, "Low memory line-based wavelet transform using lifting scheme," Tech. Rep., Canon Research Center France, 1998, ISOIEC JTC 1SC29WGl WGlN1013.

[39] G. Lafruit, L. Nachtergaele, J. Bormans, M. Engels, and I. Bolsens, "Optimal memory organization for scalable texture codecs in MPEG-4," IEEE Trans. on Circuits and Systems for Video Technology, vol. 9, no. 2, pp. 218–243, March 1999.

[40] D. Taubman, "Adaptive non-separable lifting transforms for image compression," in PTOC. ICIP, Kobe, Japan, October 1999.

[41] G. Beylkin, R. Coifman, and V. Rokhlin, "Fast wavelet transforms and numerical algorithms I," CPAM, vol. 44, pp. 141–183, 1991.

[42] M. Vetterli and J. Kovacevic, Wauelets and Subband Coding, Prentice-Hall PTR, Englewood-Cliffs, New Jersey, 1995.

[43] W. Sweldens, "The lifting scheme: A new philosophy in biorthogonal wavelet constructions," in Wavelet Applications in Signal and Image Processing III, A. F. Lame and M. Unser, Eds. 1995, pp. 68–79, Proc. SPIE 2569.

[44] J. E. Hopcroft and J. D. Ullman, Introduction to Automata Theory, Languages, and Computation, AddisonWesley Publishing Company, Reading, Mass., 1979.

What is claimed is:

1. A method for digital signal processing, comprising:

partitioning an input signal into consecutive blocks of samples, each block having a plurality of samples;

performing a multilevel filtering operation on a first block by using a discrete wavelet transform algorithm, without using information from a second adjacent block;

completing computations of said multilevel filtering operation that are computable based on information solely from said first block;

saving partially completed results from performing said multilevel filtering operation on samples in said first block near a boundary to said second adjacent block on which said multilevel filtering operation cannot be completed without specified input from said second adjacent block; and after said completing and said saving, receiving said specified input from said second adjacent block to complete said multilevel filtering operation on said samples near said boundary to said second adjacent block by using said partially completed results.

2. The method as in claim 1, wherein said discrete wavelet transform algorithm includes a factorization of a polyphase matrix.

3. The method as in claim 2, further comprising using said factorization to convert said multilevel filtering operation into updating states of a finite state machine.

4. The method as in claim 1, wherein said input signal is a one-dimensional signal.

5. The method as in claim 2, wherein said input signal is a two-dimensional signal.

6. The method as in claim 1, wherein said consecutive blocks do not overlap with one another.

7. The method as in claim 1, further comprising:

independent from said multilevel filtering operation on said first block, performing said multilevel filtering operation on said second adjacent block without information from said first block;

completing computations of said multilevel filtering operation that are computable based on information solely from said second adjacent block; and saving partially completed results from performing said multilevel filtering operation on samples in said second adjacent block near a boundary to said first block on which said multilevel filtering operation cannot be completed without input from said first block.

8. The method as in claim 1, further comprising:

using wavelet filters of a filter length L to form J consecutive filtering stages to perform said multilevel filtering operation; and using a buffer with a memory capacity not exceeding J(L−2) to store said specified input from said second adjacent block.

9. A method for digital signal processing, comprising:

partitioning an input signal into consecutive blocks of samples, each block having a plurality of samples;

using a first processor and a second processor to independently perform a multilevel filtering operation on said first block and said second adjacent block, respectively, according to a discrete wavelet transform algorithm, without exchanging information between said first and said second processors; and after each processor completes all possible computations of said multilevel filtering operation on its respective block solely based on information from said respective block, establishing a communication between said first and said second processors to transfer information of partially computed samples of said second block from said second processor to said first processor;

subsequently processing said first block based on said information from said second block to complete said multilevel filtering operation on certain samples in said first block whose discrete wavelet transform requires said information from said second block.

10. The method as in claim 9, wherein said discrete wavelet transform algorithm includes a factorization of a polyphase matrix.

11. The method as in claim 10, further comprising using said factorization to convert said multilevel filtering operation into updating states of a finite state machine.

12. A method for digital signal processing, comprising:
partitioning an input signal into consecutive blocks of samples, each block having a plurality of samples;
using a processor to perform a multilevel filtering operation on said input signal according to a discrete wavelet transform algorithm to obtain a discrete wavelet transform of said input signal;
processing one block at a time, without using information from a subsequent block, to complete all possible computations on the samples in said block and to save partially-completed results for consecutive samples whose discrete wavelet transform requires information from said subsequent block;
combining said consecutive samples with partially-completed results in said block and a plurality of consecutive new samples from said subsequent block to form a new block; and
subsequently processing said new block to complete said multilevel filtering operation on said consecutive samples originally in said block and to complete all possible computations on said consecutive samples from said subsequent block.

13. The method as in claim 12, wherein a lifting factorization is used to implement said multilevel filtering operation.

14. The method as in claim 13, wherein a buffer is implemented in said processor to have a memory size of N+Bs, where N is the number of samples in each block, and Bs is the memory size for storing overlapped data between consecutive blocks.

15. The method as in claim 14, further comprising using wavelet filters of a filter length L to form J consecutive filtering stages to perform said multilevel filtering operation, wherein said buffer has a memory capacity not exceeding N+J(L−2).

16. A digital signal processing device, comprising:
an input to receive an input signal having a plurality of samples consecutive in time;
a digital filtering device having a plurality of filtering stages to perform a discrete wavelet transform on samples received from said input to produce data representing a discrete wavelet transform said input signal, said digital filtering device operable to perform said discrete wavelet transform on one block of samples at a time, wherein said digital filtering device completes computations that are computable based on information solely from said block and perform partial computations on samples in said block which requires information from a previous block immediately preceding said block in time, without information from said previous block; and
a memory unit with a memory space sufficient to store said information from said previous block, having an input terminal coupled to receive data from an output of said digital filtering device and an output terminal to supply said information to said digital filtering device, wherein said digital filtering device receives said information, after completing said computations and partial computations on said block, to complete remaining operations of said partial computations.

17. The device as in claim 16, wherein each filtering stage includes a first filtering channel and a second filter channel in parallel to each other, said first filtering channel including a first downsampling unit to receive only odd-numbered samples and said second filtering channel including a second downsampling unit to receive only eve-numbered samples.

18. The device as in claim 16, wherein each filtering stage includes a plurality of wavelet filters.

19. The device as in claim 18, wherein said filters include Daubechies (9,7) filters.

20. The device as in claim 18, wherein said filters include Daubechies (2,10) filters.

21. The device as in claim 18, wherein said filters include CDF(4,2) filters.

22. The device as in claim 16, wherein each filtering stage includes a plurality of filters whose operations can be represented by polyphase factorized matrix elements in a lifting structure.

23. The method as in claim 13, further comprising delaying computation of a normalization factor in the lifting factorization to a last level decomposition.

24. The method as in claim 23, further comprising performing a quantization operation on said discrete wavelet transform of said input signal.

25. The method as in claim 23, further comprising jointly performing a quantization operation on said discrete wavelet transform of said input signal and computation of a normalization factor in the lifting factorization.

26. The method as in claim 12, further comprising performing a quantization operation on said discrete wavelet transform of said input signal.

27. A method for digital signal processing, comprising:
partitioning an input signal into consecutive blocks of samples, each block having a plurality of samples;
using a plurality of processors in parallel to perform a multilevel filtering operation on different blocks of said input signal according to a discrete wavelet transform algorithm to obtain a discrete wavelet transform of said input signal;
operating each processor to process one block at a time, without using information from a subsequent block, to complete all possible computations on the samples in said block and to save partially-completed results for consecutive samples whose discrete wavelet transform requires information from said subsequent block;
combining said consecutive samples with partially-completed results in said block and a plurality of consecutive new samples from said subsequent block to form a new block; and
subsequently processing said new block to complete said multilevel filtering operation on said consecutive samples originally from in said block and to complete all possible computations on said consecutive samples from said subsequent block.

28. The method as in claim 27, wherein a lifting factorization is used to implement said multilevel filtering operation.

29. The method as in claim 28, further comprising delaying computation of a normalization factor in the lifting factorization to a last level decomposition.

30. The method as in claim 29, further comprising: upon completing said multilevel filtering operation, performing a quantization operation on said discrete wavelet transform of said input signal.

31. The method as in claim 29, further comprising jointly performing a quantization operation on said discrete wavelet transform of said input signal and computation of a normalization factor in the lifting factorization.

32. The method as in claim 27, further comprising performing a quantization operation on said discrete wavelet transform of said input signal.

* * * * *

UNITED STATES PATENT AND TRADEMARK OFFICE
CERTIFICATE OF CORRECTION

PATENT NO.   : 6,757,343 B1
DATED        : June 29, 2004
INVENTOR(S)  : Antonio Ortega and Wenqing Jiang Page 1 of 1

It is certified that error appears in the above-identified patent and that said Letters Patent is hereby corrected as shown below:

<u>Column 1,</u>
Line 7, before "BACKGROUND", please insert the following:

-- STATEMENT AS TO FEDERALLY-SPONSORED RESEARCH
This invention was made with government support under Contract No. MIP 9502227 awarded by the National Science Foundation The government has certain rights in the invention. --

Signed and Sealed this

Twenty-eighth Day of December, 2004

JON W. DUDAS
*Director of the United States Patent and Trademark Office*